US010209473B2

(12) United States Patent
Bishop et al.

(10) Patent No.: US 10,209,473 B2
(45) Date of Patent: Feb. 19, 2019

(54) OPTICAL TERMINATION ENCLOSURE

(71) Applicant: CommScope Technologies LLC, Hickory, NC (US)

(72) Inventors: Erik David Bishop, Fuquay-Varina, NC (US); James Albert Powell, Garner, NC (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 15/737,666

(22) PCT Filed: Jun. 15, 2016

(86) PCT No.: PCT/US2016/037587
§ 371 (c)(1),
(2) Date: Dec. 18, 2017

(87) PCT Pub. No.: WO2016/205340
PCT Pub. Date: Dec. 22, 2016

(65) Prior Publication Data
US 2018/0157002 A1 Jun. 7, 2018

Related U.S. Application Data

(60) Provisional application No. 62/182,064, filed on Jun. 19, 2015, provisional application No. 62/320,968, filed on Apr. 11, 2016.

(51) Int. Cl.
*G02B 6/00* (2006.01)
*G02B 6/44* (2006.01)
(Continued)

(52) U.S. Cl.
CPC ......... *G02B 6/4471* (2013.01); *G02B 6/4441* (2013.01); *G02B 6/4444* (2013.01);
(Continued)

(58) Field of Classification Search
CPC .. G02B 6/4471; G02B 6/4444; G02B 6/3887; G02B 6/3897; G02B 6/4454; G02B 6/3825; H02G 15/115; H02G 15/013
See application file for complete search history.

(56) References Cited

U.S. PATENT DOCUMENTS

| 5,598,499 A | 1/1997 | Burek et al. |
| 5,933,556 A | 8/1999 | Hawkins |

(Continued)

FOREIGN PATENT DOCUMENTS

| EP | 0 848 268 A1 | 6/1998 |
| WO | 01/41276 A2 | 6/2001 |

(Continued)

OTHER PUBLICATIONS

International Search Report and Written Opinion of the International Searching Authority for corresponding International Patent Application No. PCT/US2016/037587 dated Sep. 23, 2016, 12 pages.

*Primary Examiner* — Ellen Kim
(74) *Attorney, Agent, or Firm* — Merchant & Gould P.C.

(57) ABSTRACT

The present disclosure relates to an optical termination enclosure having an enclosure housing containing a fiber management assembly. The enclosure housing can define sealed cable ports and can include cable anchor mounting locations in alignment with the cable ports. Cable anchoring and grounding units can be attached at the cable anchor mounting locations. The fiber management assembly can include a fiber break-out arrangement including a resilient grommet used to anchor a protective tube that carries optical fibers from the cable anchor mounting location to the fiber management assembly.

14 Claims, 24 Drawing Sheets

(51) Int. Cl.
*H02G 15/013* (2006.01)
*H02G 15/115* (2006.01)
*G02B 6/38* (2006.01)

(52) U.S. Cl.
CPC ......... *H02G 15/013* (2013.01); *H02G 15/115* (2013.01); *G02B 6/3825* (2013.01); *G02B 6/3887* (2013.01); *G02B 6/3897* (2013.01); *G02B 6/4454* (2013.01)

(56) References Cited

U.S. PATENT DOCUMENTS

| | | | |
|---|---|---|---|
| 6,361,523 B1* | 3/2002 | Bierman | A61M 25/02 |
| | | | 128/DIG. 26 |
| 6,802,512 B2 | 10/2004 | Muller et al. | |
| 7,013,074 B2 | 3/2006 | Battey et al. | |
| 7,120,347 B2 | 10/2006 | Blackwell et al. | |
| 7,477,826 B2 | 1/2009 | Mullaney et al. | |
| 7,744,288 B2 | 6/2010 | Lu et al. | |
| 7,751,675 B2 | 7/2010 | Holmberg et al. | |
| 7,770,848 B2* | 8/2010 | Johnson | F16L 3/1207 |
| | | | 248/65 |
| 7,844,158 B2 | 11/2010 | Gronvall et al. | |
| 7,938,371 B2* | 5/2011 | Oga | F16L 3/1025 |
| | | | 248/55 |
| 7,941,027 B2 | 5/2011 | Mertsdorf et al. | |
| 8,111,966 B2 | 2/2012 | Holmberg et al. | |
| 8,213,760 B2 | 7/2012 | Rudenick et al. | |
| 8,363,999 B2 | 1/2013 | Mertsdorf et al. | |
| 8,554,044 B2 | 10/2013 | Bran De Leon et al. | |
| 8,556,859 B2* | 10/2013 | Nilson | A61M 25/02 |
| | | | 604/174 |
| 8,718,434 B2 | 5/2014 | Gronvall et al. | |
| 8,837,894 B2 | 9/2014 | Holmberg et al. | |
| 9,222,602 B2* | 12/2015 | Dworak, Jr. | F16L 3/1075 |
| 9,464,734 B2* | 10/2016 | Okura | B60R 16/0215 |
| 9,753,239 B2 | 9/2017 | Allen et al. | |
| 2012/0230646 A1 | 9/2012 | Thompson et al. | |
| 2012/0318933 A1 | 12/2012 | Kimball et al. | |
| 2013/0022328 A1 | 1/2013 | Gronvall et al. | |

FOREIGN PATENT DOCUMENTS

| | | |
|---|---|---|
| WO | 2014/173930 A1 | 10/2014 |
| WO | 2015/150204 A2 | 10/2015 |

* cited by examiner

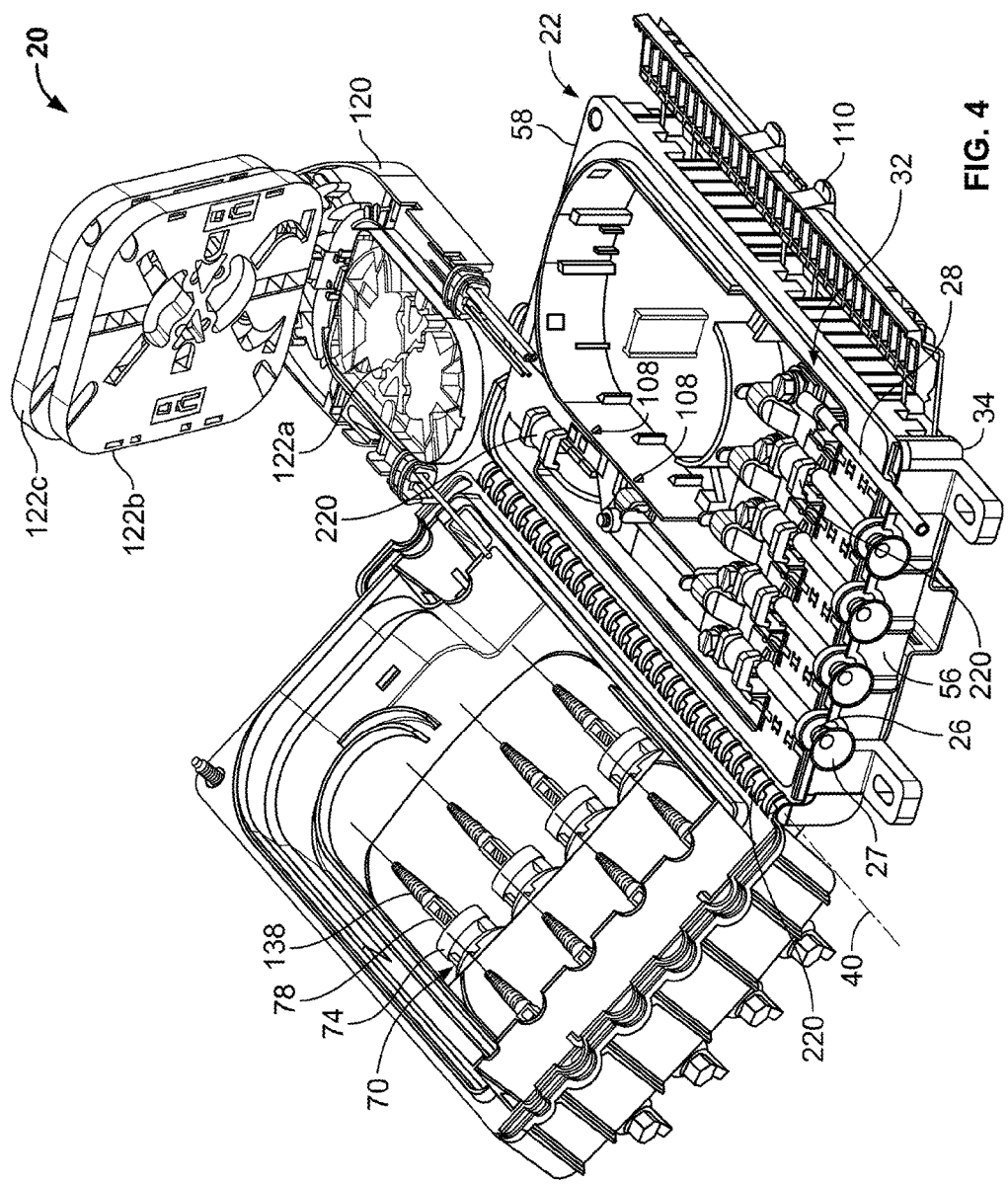

OPTICAL TERMINATION ENCLOSURE

CROSS-REFERENCE TO RELATED APPLICATIONS

This application is a National Stage Application of PCT/US2016/037587, filed on Jun. 15, 2016, which claims the benefit of U.S. Patent Application Ser. No. 62/182,064, filed Jun. 19, 2015 and claims the benefit of U.S. Patent Application Ser. No. 62/320,968, filed Apr. 11, 2016, the disclosures of which are incorporated herein by reference in their entireties. To the extent appropriate, a claim of priority is made to each of the above disclosed applications.

TECHNICAL FIELD

The present disclosure relates generally to fiber optic cable networks. More specifically, the present disclosure relates to cable enclosures, cable anchoring systems and fiber management systems used in fiber optic cable networks.

BACKGROUND

In many traditional communications networks, fiber optic cables have been used to carry data long distances between telecommunication company installations. In such traditional communications networks, other types of cables, such as copper wire loops and coaxial cables, have been used to carry data from telecommunication company installations to homes and businesses. Recently, there has been a movement to extend the fiber optic portion of the communications networks closer to homes and businesses. In some circumstances, the fiber optic portions of the communications networks extend into to the homes and businesses themselves.

Extending the fiber optic portion of a communications network closer to homes and businesses has necessitated the deployment of Optical Termination Enclosures (OTEs). An OTE is an enclosure that is designed to facilitate splicing and termination of one or more fiber optic cables. A typical OTE has a set of cable entry ports through which fiber optic cables enter the OTE. One or more of the cable entry ports may accommodate "feeder" cables that connect to upstream points, such as telecommunication company installations, in a communications network. One or more of the other cable entry ports may accommodate "drop" cables that connect to downstream points in the communications network, such as homes and businesses.

OTEs are frequently mounted on utility poles, walls, utility boxes, and other outdoor surfaces. Because OTEs are mounted outdoors, they are exposed to various environmental elements such as heat, cold, dust, sunlight, rain, snow, plants, animals, and so on. Because the splicing and termination capabilities of an OTE would be destroyed or impaired if such environmental elements were permitted to access the interior of the OTE, it is important to ensure that such environmental elements are not permitted to access the interior of the OTE.

SUMMARY

Aspects of the present disclosure relate to structures, features and methods for facilitating anchoring, breaking out, and otherwise managing signal conveyance lines/structures (e.g., fiber optic cables, electrical cables, optical fibers, conductors, etc.).

Aspects of the present disclosure also relate to optical fiber break-out arrangements that use resilient grommets to anchor protective tubes (e.g., furcation tubes, buffer tubes, etc.) to a structure such as a fiber management tray.

Aspects of the present disclosure further relate to a cable anchoring unit having a cable jacket clamping location and a separate cable strength member clamping locations. In certain examples, a cable jacket can be pre-anchored to the cable jacket clamping location and a cable strength member can be pre-anchored to the strength-member anchoring location before the cable anchoring unit is attached to a corresponding mounting location such as a mounting location within an enclosure. In certain examples the cable anchoring unit also functions to make an electrical ground connection with the cable (e.g., when the cable is a shielded cable).

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventions and inventive concepts upon which the embodiments disclosed herein are based.

BRIEF DESCRIPTION OF THE DRAWINGS

FIG. 4 is a perspective view of the optical termination enclosure of FIG. 1 showing trays of the fiber management assembly pivoted up;

DETAILED DESCRIPTION

Figure 1:
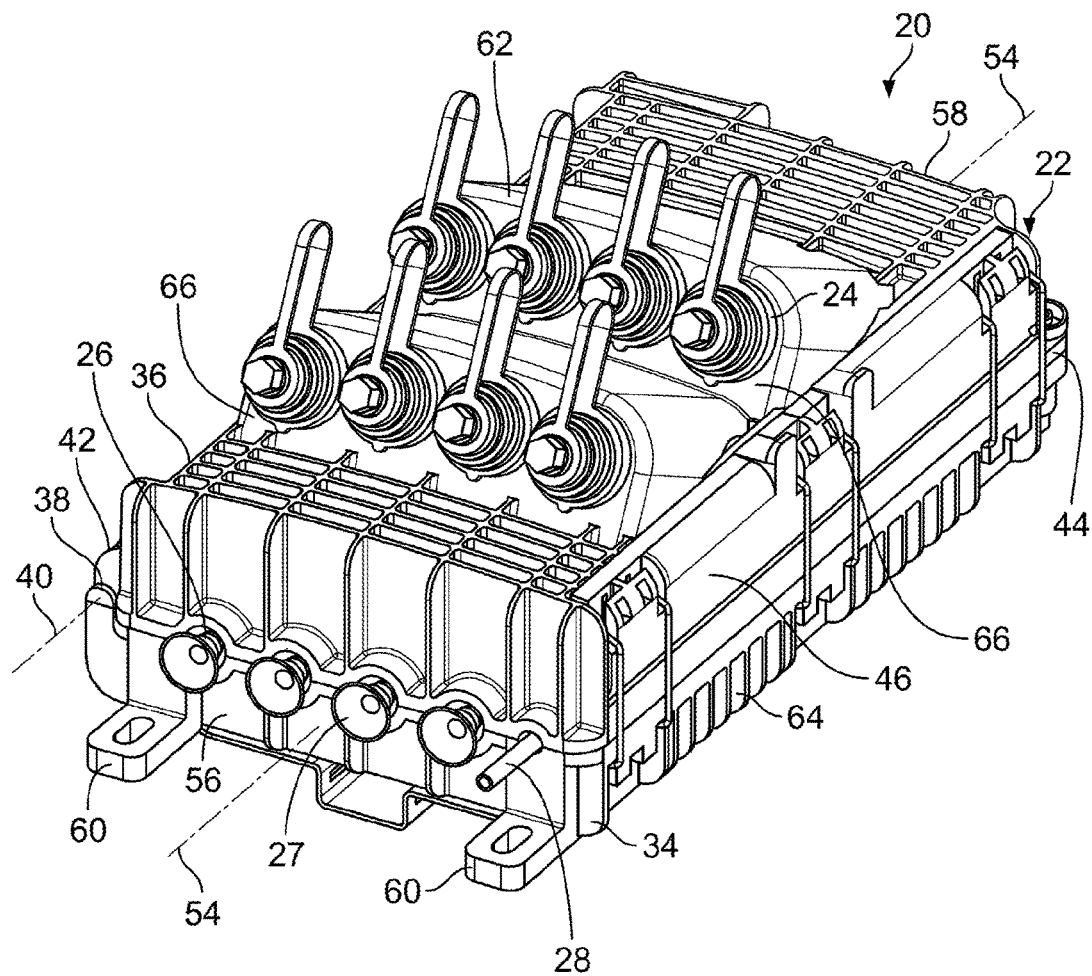
FIG. 1 is a perspective view of an optical termination enclosure in accordance with the principles of the present disclosure, the enclosure is shown in a closed position.
Figure 2:
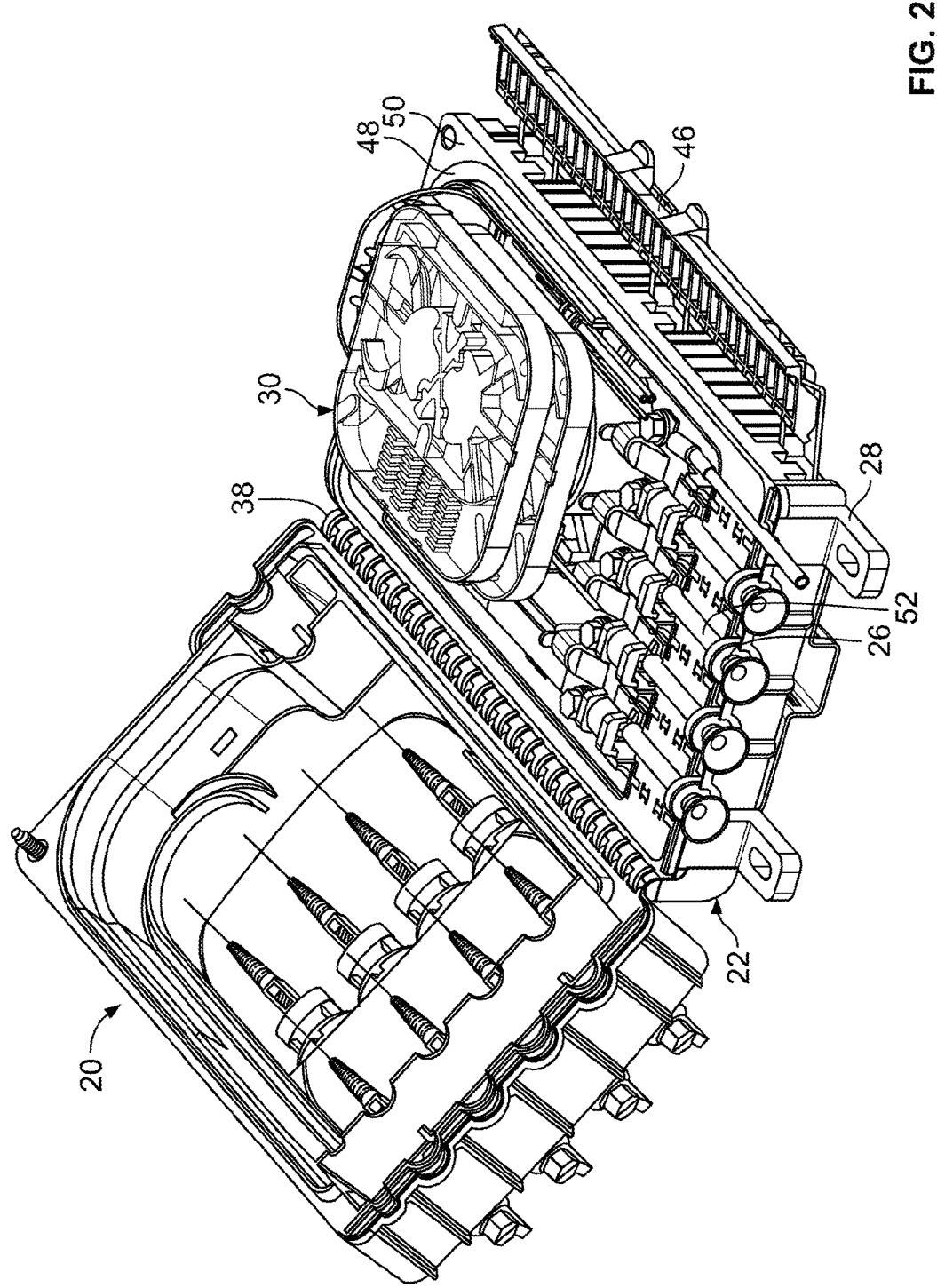
FIG. 2 is a perspective view of the optical termination enclosure of FIG. 1 shown in an open position.

FIG. 1 illustrates an optical termination enclosure 20 in accordance with the principles of the present disclosure. The optical termination enclosure includes an enclosure housing 22 which is preferably re-enterable and environmentally sealed. The optical termination enclosure 22 further includes a plurality of ruggedized connector ports 24 adapted for receiving ruggedized connectors. In certain examples, the ruggedized connectors are mounted at the ends of drop cables routed to subscriber locations. The ruggedized connector ports 24 are preferably environmentally sealed. The optical termination enclosure 20 also includes a plurality of cable ports 26 for allowing fiber optic cables to be routed into and out of the enclosure housing 22. Preferably, the cable ports 26 provided sealed interfaces with the fiber optic cables routed there through. In certain examples, the fiber optic cables can be routed in a straight pass-through configuration or in a butt-style pass-through configuration. The optical termination enclosure 20 further includes a grounding cable port 28 for receiving a grounding cable in a sealed manner. Additionally, as shown at FIG. 2, the optical termination enclosure 20 further includes an internal fiber management assembly 30 and an internal cable anchoring and grounding assembly 32. The fiber management assembly 30 and the cable anchoring and grounding assembly 32 are positioned inside the enclosure housing 22.

Referring still to FIGS. 1 and 2, the enclosure housing 22 of the optical termination enclosure 20 includes a housing base 34 pivotally connected to a housing cover 36 by a hinge 38. The hinge 38 allows the housing base 34 and the housing cover 36 to pivot relative to one another about a pivot axis 40 between a closed configuration (see FIG. 1) and an open position (see FIG. 2). The enclosure housing 22 includes a first side 42 and an opposite second side 44. The hinge 38 extends along the first side 42 of the enclosure housing 22 and a latch 46 is provided at the second side 44 of the enclosure housing 22. The latch 46 is configured to retain the housing base 34 and the housing cover 36 in the closed configuration of FIG. 1. By opening the latch 46, the enclosure housing 22 can be moved to the open configuration of FIG. 2.

In certain examples, the enclosure housing 22 is environmentally sealed and adapted for outdoor use. As shown at FIG. 2, the enclosure housing 22 includes a perimeter seal 48 for providing environmental sealing between the housing base 34 and the housing cover 36 when the enclosure housing 22 is in the closed configuration. The perimeter seal 48 can be mounted within a perimeter channel 50 defined by the housing base 34. In certain examples, a thickened portion 52 of the perimeter seal 48 can be used to provide sealing of the cable ports 26 and the grounding cable port 28.

Referring to FIG. 1, the enclosure housing 22 can be elongated along a housing axis 54. The housing axis 54 can extend between opposite first and second ends 56, 58 of the enclosure housing 22. The cable ports 26 as well as the cable grounding port 28 are provided at the first end 56 of the enclosure housing 22. At least one of the cable ports 26 can also be provided at the second end 58 of the enclosure housing 22. In certain examples, the cable ports 26 can be configured for routing a feeder cable into and out of the enclosure housing 22. In a butt-style pass-through configuration, a feeder cable enters the enclosure housing 22 through one of the cable ports 26 at the first end 56 of the enclosure housing 22 and exits the enclosure housing 22 through another one of the cable ports 26 at the first end 56 of the enclosure housing 22. In a straight pass-through configuration, the feeder cable enters the enclosure housing 22 through one of the cable ports 26 at the first end 56 of the enclosure housing 22 and exits the enclosure housing 22 through the cable port 26 at the second end 58 of the enclosure housing 22. Within the enclosure housing 22, at least one of the optical fibers of the feeder cable is accessed. In certain examples, the portion of the feeder cable positioned within the enclosure housing 22 has the jacket removed to facilitate accessing the optical fibers.

The housing base 34 of the enclosure housing 22 can include structure for mounting the optical termination enclosure 20 in the field. In certain examples, the optical termination enclosure 20 can be mounted aerially or underground. In certain examples, the housing base 34 can include mounting tabs 60 for use in mounting the optical termination enclosure 20 to a wall of a handhole, to a post, to a pole or to another structure with the use of fasteners, straps, ties, or other structures. In certain examples, the optical termination enclosure 20 can further include a bracket or other structure having openings that facilitate mounting the optical termination enclosure 20 to a self-supporting aerial cable or other structure via the fastening elements such as straps, ties, or other fasteners.

Figure 10:
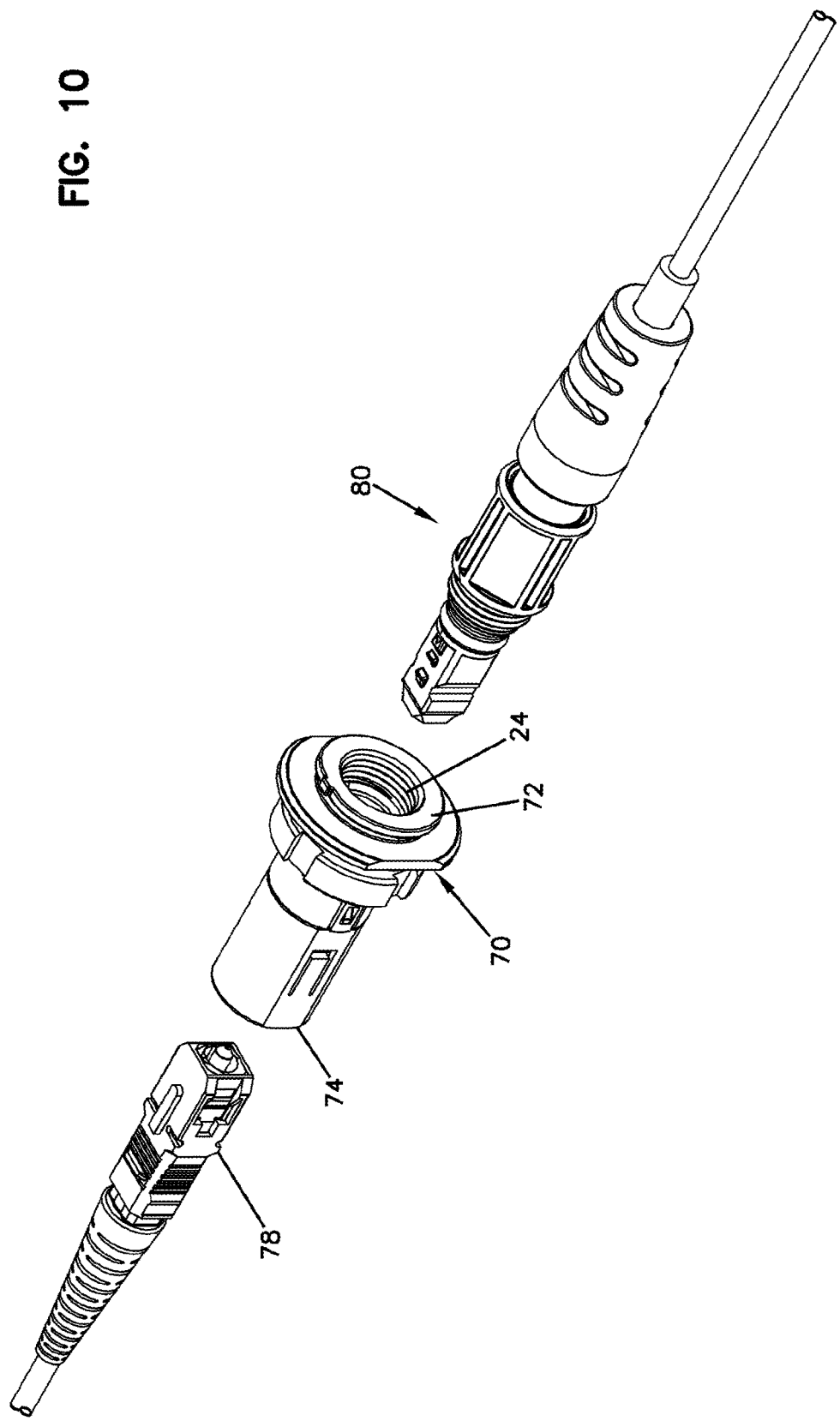
FIG. 10 is an exploded view of an example fiber optic adapter and corresponding connectors that can be used with the optical termination enclosure of FIG. 1.
Figure 11:
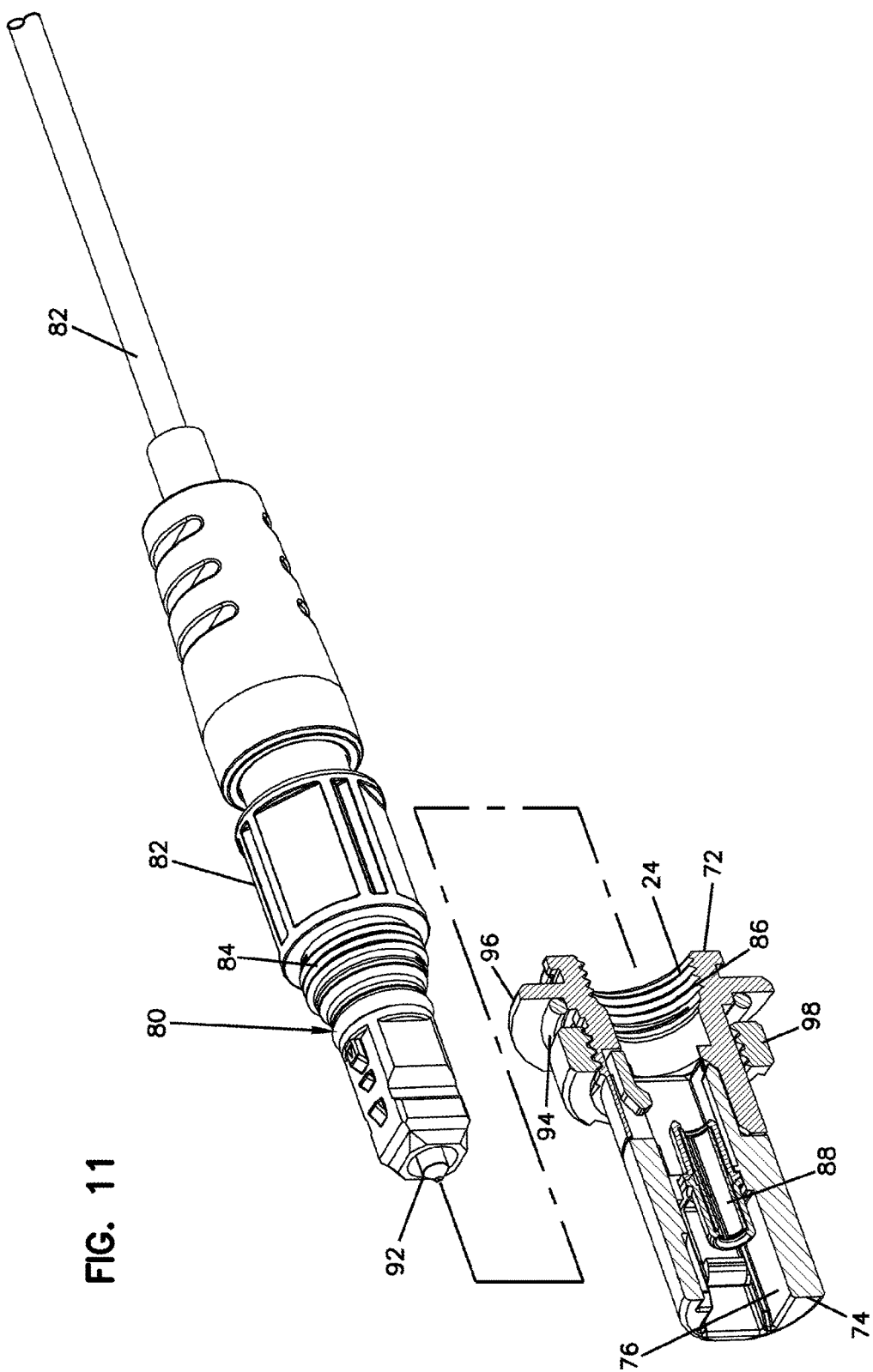
FIG. 11 is a cross-section view of the fiber optic adapter and one of the fiber optic connectors of FIG. 10.
Figure 12:
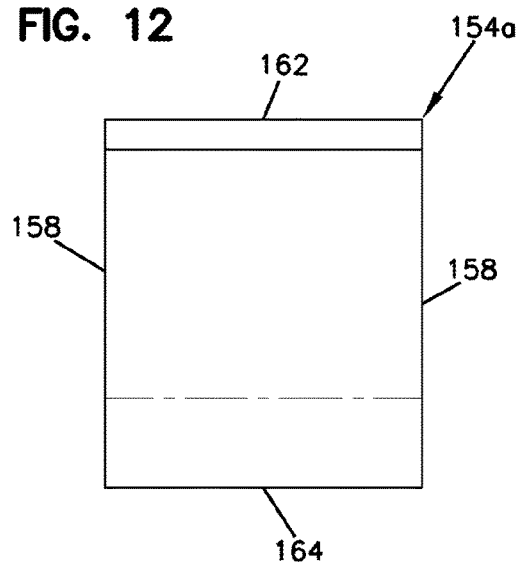
FIG. 12 is a side view of one of the grommets of the arrangement of FIG. 6.
Figure 13:
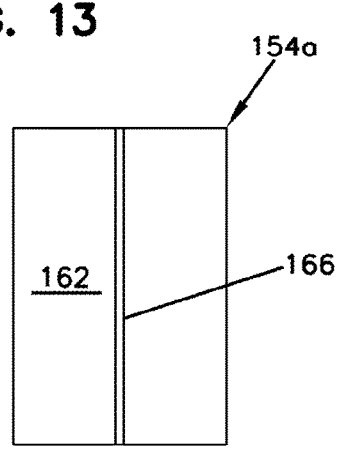
FIG. 13 is a top view of the grommet of FIG. 12.
Figure 14:
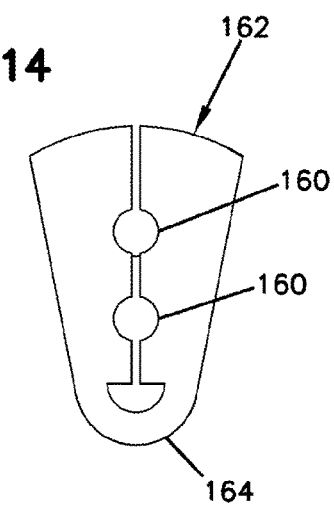
FIG. 14 is an end view of the grommet of FIG. 12.

Referring still to FIGS. 1 and 2, the enclosure housing 22 can include a front face 62 and a rear face 64. When the optical termination enclosure 20 is mounted to another structure, rear face 64 typically faces toward the other structure and the front face 62 faces outwardly from the other structure. The ruggedized connector ports 24 are provided at the front face 62 of the enclosure housing 22. As best shown at FIG. 1, the front face 22 can include a stepped configuration (i.e., a tiered configuration) that includes a plurality of adapter mounting surfaces 66 that are angled to face at least partially toward the first end 56 of the enclosure housing 22. The adapter mounting surface 66 define openings in which ruggedized fiber optic adapters 70 are mounted. The fiber optic adapters 70 are configured to define the connector ports 24. FIGS. 10 and 11 illustrate one of the fiber optic adapters 70 in isolation from the enclosure housing 22. The fiber optic adapter 70 has an outer end 72 that defines one of the ruggedized connector ports 24. The fiber optic adapter 70 also includes an inner end 74 defining a non-ruggedized port 76 adapted for receiving a non-ruggedized fiber optic connector 78 such as an SC-style connector. The ruggedized cable port 26 is adapted for receiving a ruggedized connector 80 that can terminate the end of a cable such as a drop cable 82. The ruggedized connector 80 can include a robust fastening element for securing the ruggedized connector 80 within the cable port 26. In the depicted example, the robust fastening element includes a nut 82 having external threads 84 that mate with internal threads 86 of the fiber optic adapter 70. In certain examples, the fastening arrangement can withstand a pull-out force of at least twenty-five pounds or at least fifty pounds. While the fastening arrangement has been depicted as threads, in other examples, other types of fastening arrangements such as bayonet-style fastening interfaces can be used. Additionally, in other examples, the ruggedized connector can include a sleeve having internal threads that mate with external threads of the fiber optic adapter.

It will be appreciated that the fiber optic adapter 70 is configured to provide an optical coupling between the ruggedized connector 80 and the non-ruggedized connector 78. In this regard, the fiber optic adapter 70 includes an internal ferrule alignment sleeve 88. When the connectors 78, 80 are secured within their corresponding ports of the fiber optic adapter 70, ferrules 90, 92 of the fiber optic connectors 78, 80 are received within the ferrule alignment sleeve 88 such that optical fibers supported within the ferrules 90, 92 are co-axially aligned with one another. In this way, an optical connection is made between the non-ruggedized connector 78 and the ruggedized connector 80.

It will be appreciated that the fiber optic adapter 70 is preferably environmentally sealed relative to the enclosure housing 22. In this regard, the fiber optic adapter 70 can include a seal 94 that is compressed between the adapter mounting surface 66 and a flange 96 of the fiber optic adapter 70 when the fiber optic adapter 70 is installed within one of the openings in the adapter mounting surface 66. A fastener such as a threaded sleeve 98 can be used to secure the fiber optic adapter 70 within its corresponding opening.

Figure 3:
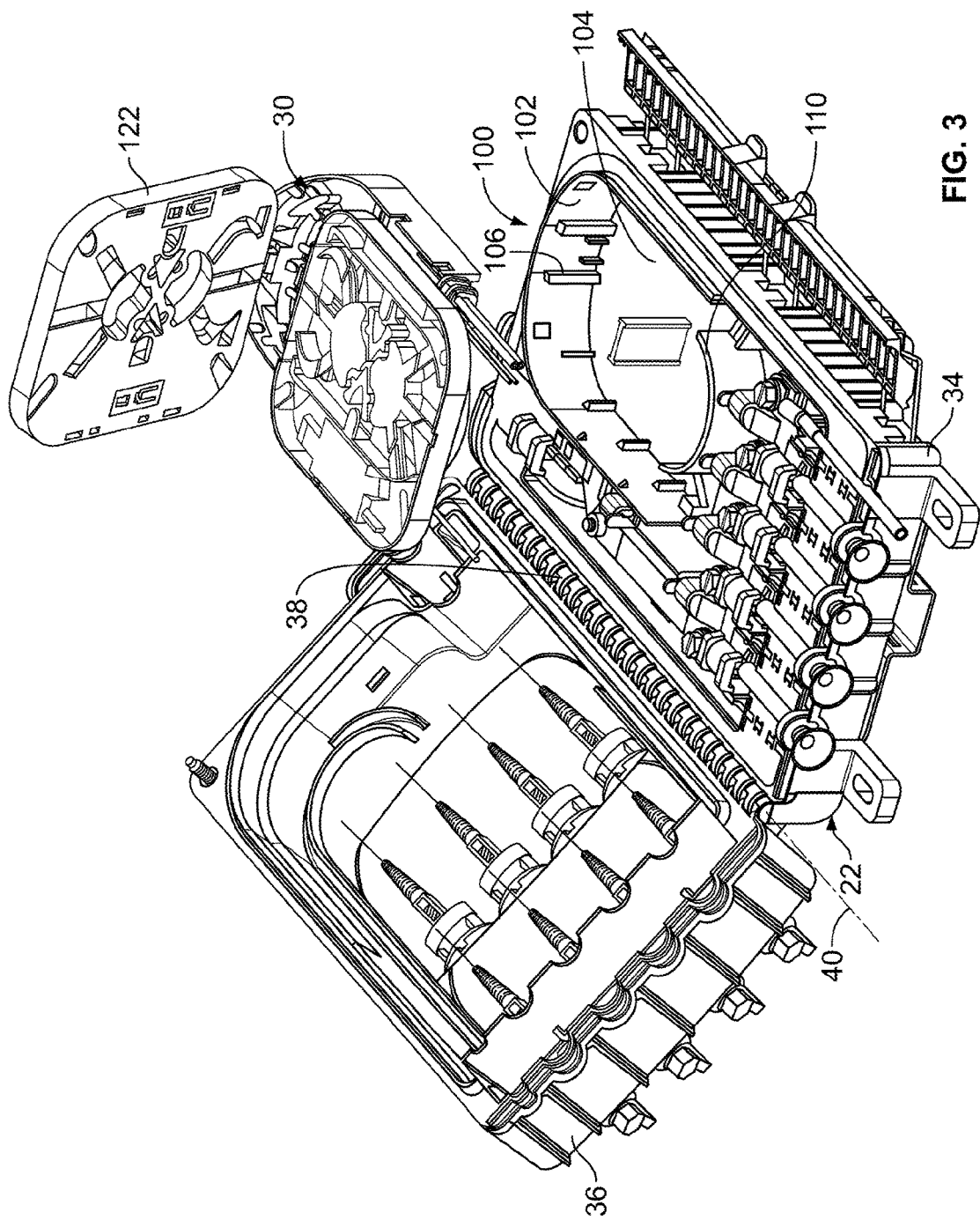
FIG. 3 is a perspective view of the optical termination enclosure of FIG. 1 showing a fiber management assembly exploded out from an enclosure housing of the optical termination enclosure.

Referring to FIGS. 3 and 4, the housing base 34 can include a cradle 100 for receiving and mounting the fiber management assembly 30. The cradle 100 can include a cradle wall 102 arranged in a generally U-shaped configuration. The cradle wall 102 projects forwardly from a rear wall 104 of the housing base 34. A plurality of support columns 106 also project forwardly from the rear wall 104. The support columns 106 are positioned along an inner side of the cradle wall 102. The cradle 100 further includes retention tabs 108 that project inwardly from the cradle wall 102. As shown at FIG. 4, the housing base 34 can also include a fiber bend radius limiter 110 (e.g., a curved fiber guide wall) that projects forwardly from the rear wall 104.

As shown at FIGS. 2-4, the fiber management assembly 30 includes a fiber management assembly base 120 and a plurality of fiber management trays 122 pivotally connected to the fiber management assembly base 120. The fiber management trays 122 include a first fiber management tray 122a, a second fiber management tray 122b, and a third fiber management tray 122c which are stacked one on top of the other with the first fiber management tray 122a positioned at a rear-most location and the third fiber management tray 122c positioned at a front-most position. By pivoting the fiber management trays 122a-122c, each of the fiber management trays 122a-122c can be readily accessed.

Figure 5:
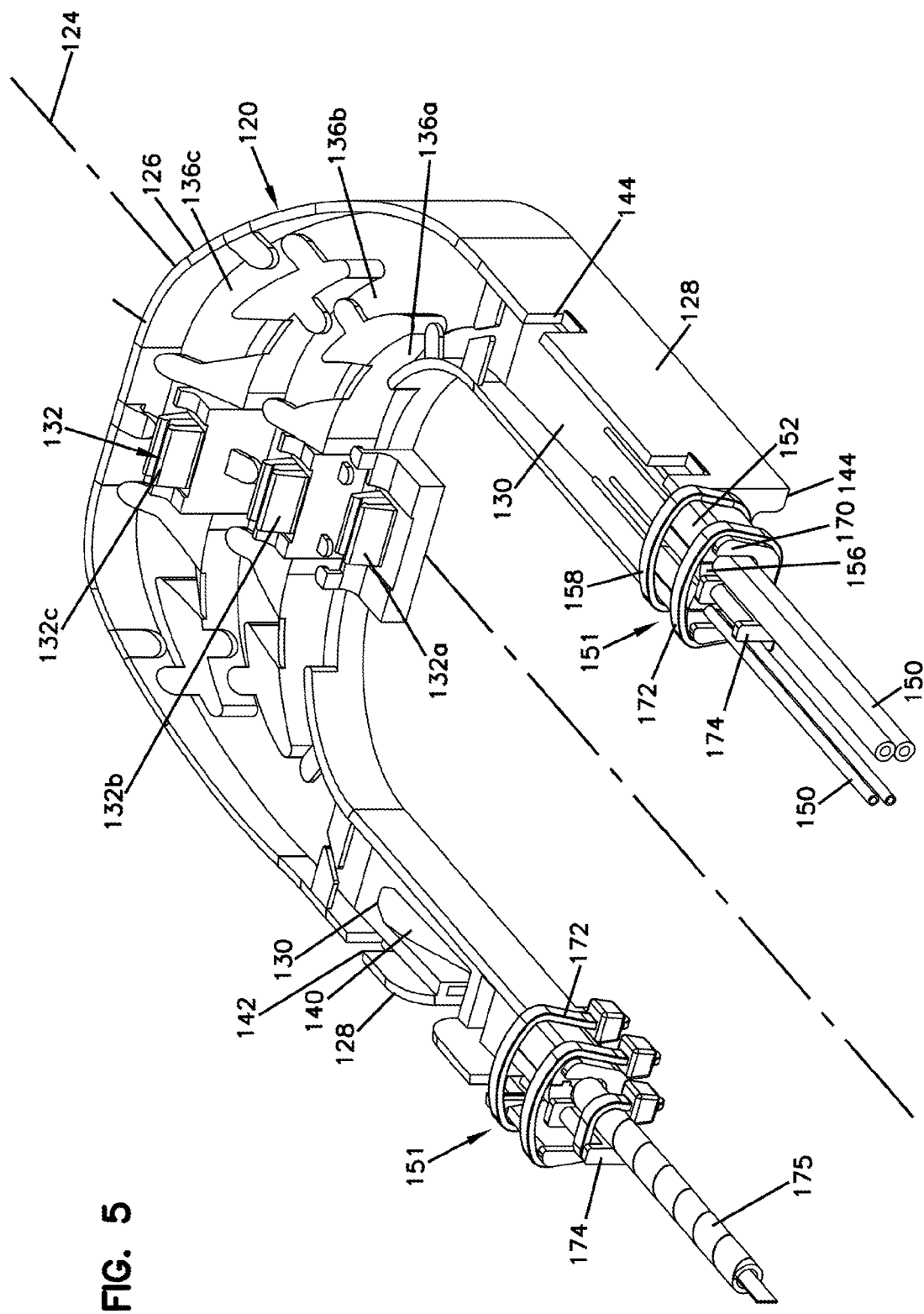
FIG. 5 is a perspective view of a fiber management base of the fiber management assembly of the optical termination enclosure of FIG. 1.

Referring to FIG. 5, the fiber management assembly base 120 is generally U-shaped and is bisected by a central axis 124. The fiber management assembly base 120 includes a mid-portion 126 that is bisected by the central axis 124, and two parallel legs 128 positioned on opposite sides of the central axis 124. The legs 128 project outwardly from the mid-portion 126 and define fiber lead-in channels 130 for guiding optical fibers to the mid-portion 126. Tray mounts 132 are positioned at the mid-portion 126. The tray mounts 132 include receptacles 134 in which pivot-pins of the fiber management trays 122 are snapped. The tray mounts 132 are positioned at different elevations from one another and can include a first tray mount 132a corresponding to the first fiber management tray 120a, a second tray mount 132b corresponding to the second fiber management tray 122b and a third tray mount 132b corresponding to the third fiber management tray 122c. The tray mount 132a is lower (e.g., more rearward) than the tray mount 132b and the tray mount 132b is lower (e.g., more rearward) than the tray mount 132c. The fiber management assembly base 120 includes separate channels 136a-136c corresponding to each of the tray mounts 132a-132c. The fiber management assembly base 120 can be ramped so as to direct optical fibers to the different elevations of the tray mounts 132a-132c.

It will be appreciated that the fiber management trays 122 can include various fiber management structures. Example fiber management structures include guide channels for guiding optical fibers, bend radius limiters, structure for storing excess optical fiber in loops, optical splice holders, and other structures. Additionally, optical components such as passive optical power splitters, coarse wavelength division multiplexers, dense wavelength division multiplexers, or other components can be mounted on one or more of the fiber management trays 122. In certain examples, a passive optical power splitter can be mounted on one of the trays and can include connectorized output pigtails that are routed from the fiber management assembly 30 to the inner ends 74 of the fiber optic adapters 70. For example, as shown at FIG. 3, connectorized ends 138 of the output pigtails of the passive optical power splitter are shown plugged into the inner ends 74 of the fiber optic adapters 70. The connectorized ends 138 can include the non-ruggedized fiber optic connectors 78. It will be appreciated that an input of the passive optical power splitter can be optically connected (e.g., fusion spliced or otherwise spliced) to one of the optical fibers of a feeder cable routed through the optical termination enclosure 20. Additionally, in certain examples, output pigtails from passive optical splitters can also be optically connected to (e.g., spliced to) drop cables routed out of the enclosure housing 22 through selected ones of the cable ports 26

In other examples, an optical fiber of the feeder cable can be spliced to an input of a wavelength division multiplexer. The wavelength division multiplexor can have output pigtails having connectorized ends inserted into the inner ends 74 of the fiber optic adapters 70. Alternatively, certain outputs of the wavelength division multiplexer can be spliced to drop cables routed out selected ones of the cable ports 26. In certain examples, optical power splitters or wavelength division multiplexers used within the optical termination enclosure 20 can have more outputs than the number of fiber optic adapters 70 provided. In such cases, additional drops can be provided by splicing the excess outputs to cables routed out the extra cable ports 26. In still other examples, selected fibers from the feeder cable may be spliced or otherwise optically connected to drop cables routed out of the enclosure housing 22 through cable ports 26. Fibers from the feeder cable can also be or spliced or otherwise optically connected directly to pigtails having connectorized ends inserted into the inner ends 74 of the fiber optic adapters 70. Thus, in such examples, non-split or wavelength divided signals can be output from the optical termination enclosure 20 through either the fiber optic adapters 70 defining the connector ports 24 or through the cable ports 26.

In certain examples, connectorized pigtails corresponding to optical power splitters or wavelength division multiplexers provided on at least one of the fiber management trays 22 can be routed to the fiber optic adapters 70 along a predetermined route designed to minimize movement of the pigtails. For example, the pigtails can be routed from their corresponding fiber management tray 22 to the fiber lead-in channel 130 located closest to the hinge 38. From the fiber lead-in channel 130 the connectorized pigtails can be routed down a ramp 140 and out a side opening 142 of the corresponding leg 128. Thereafter, the pigtails can be routed across the hinge 38 and into one or more fiber management structures (e.g., channels or other fiber pathways) defined within the interior of the housing cover 36. The portions of the pigtails traversing the hinge can be protected by spiral wrap. Ultimately, the connectorized ends of the pigtails are routed to the fiber optic adapters 70 and plugged into the non-ruggedized ports 76 of the fiber optic adapters 70.

In certain examples, the cable ports 26 can be sealed with plugs 27 when not occupied with cables. In certain examples, the plugs 27 are removable when the enclosure housing 22 is in the open configuration. With the enclosure housing 22 is in the open configuration, the plugs 27 can be removed thereby allowing cables to be inserted within the vacated cable ports 26.

To mount the fiber management assembly 30 within the housing base 34, the fiber management assembly base 120 is nested within the cradle 102. As so nested, the fiber management assembly base 120 is supported on the support columns 106 within the cradle 100 at an elevated position relative to the rear wall 104. In this way, space is provided beneath the fiber management assembly base 120 for storing non-accessed optical fibers of the feeder cable. In certain examples, the non-accessed fibers are stored in a fiber loop beneath the fiber management assembly base 120. In certain examples, the fiber management assembly base 120 can be connected to the cradle wall 102 by a snap-fit connection. For example, the retention tabs 108 that project from the cradle wall 102 can snap within corresponding notches 144 defined in the legs 128 of the fiber management assembly base 120.

Figure 4A:
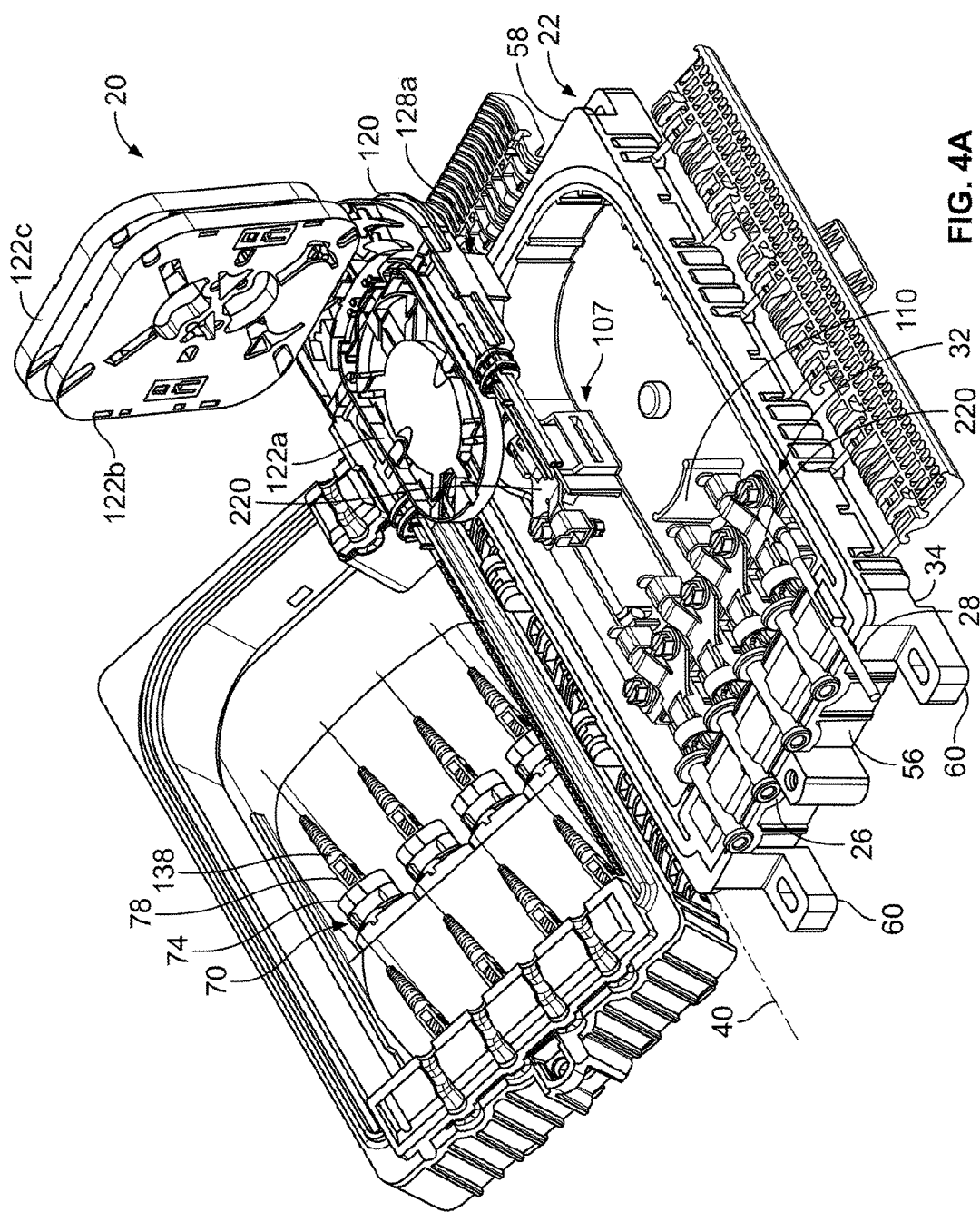
FIG. 4A is a perspective view of another optical termination enclosure in accordance with the principles of the present disclosure showing trays of a fiber management assembly pivoted up.

FIG. 4A shows an alternative snap configuration of a retention housing 107 that projects from the cradle wall 102. Legs 128a of the fiber management assembly base 120 can snap within the retention housing 107 to mount the fiber management assembly 30 within in the housing base 34.

In certain examples of the present disclosure, it will be appreciated that the fiber management assembly base 120, itself can be considered as a tray. Generally, as used herein, fiber management trays are modular structures having features for managing optical fibers such as channels, bend radius limiters, fiber routing paths or other structures. Trays can also have structures for holding fiber optic components such as passive optical splitters, wavelength division multiplexers or splice sleeves.

In certain examples, optical fibers from the feeder cable can be routed into the fiber management assembly 30 through ends 144 of the legs 128 of the fiber management assembly base 120. In certain examples, the optical fibers of the feeder cables can be protected within protective tubes (e.g., buffer tubes, furcation tubes, etc.). In certain examples, the protective tubes 150 can have end portions anchored (i.e., secured, coupled attached, mounted, etc.) to the fiber management assembly base 120. The protective tubes 150 can terminate at the anchoring locations 151 and the optical fibers can continue beyond the end portions of the protective tubes 150 into the fiber management assembly 30. Within the fiber management assembly 30, fibers are protected by the various channels and other structures of the trays of the fiber management assembly 30 and therefor do not need the protection provided by the protective tubes 150. The optical fibers are thus broken out from the protective tubes 150 at the anchoring location 151 so that the protective tubes 150 do not occupy the limited space provided within the fiber management assembly 30 and do not interfere with operations such as splicing.

Figure 6:
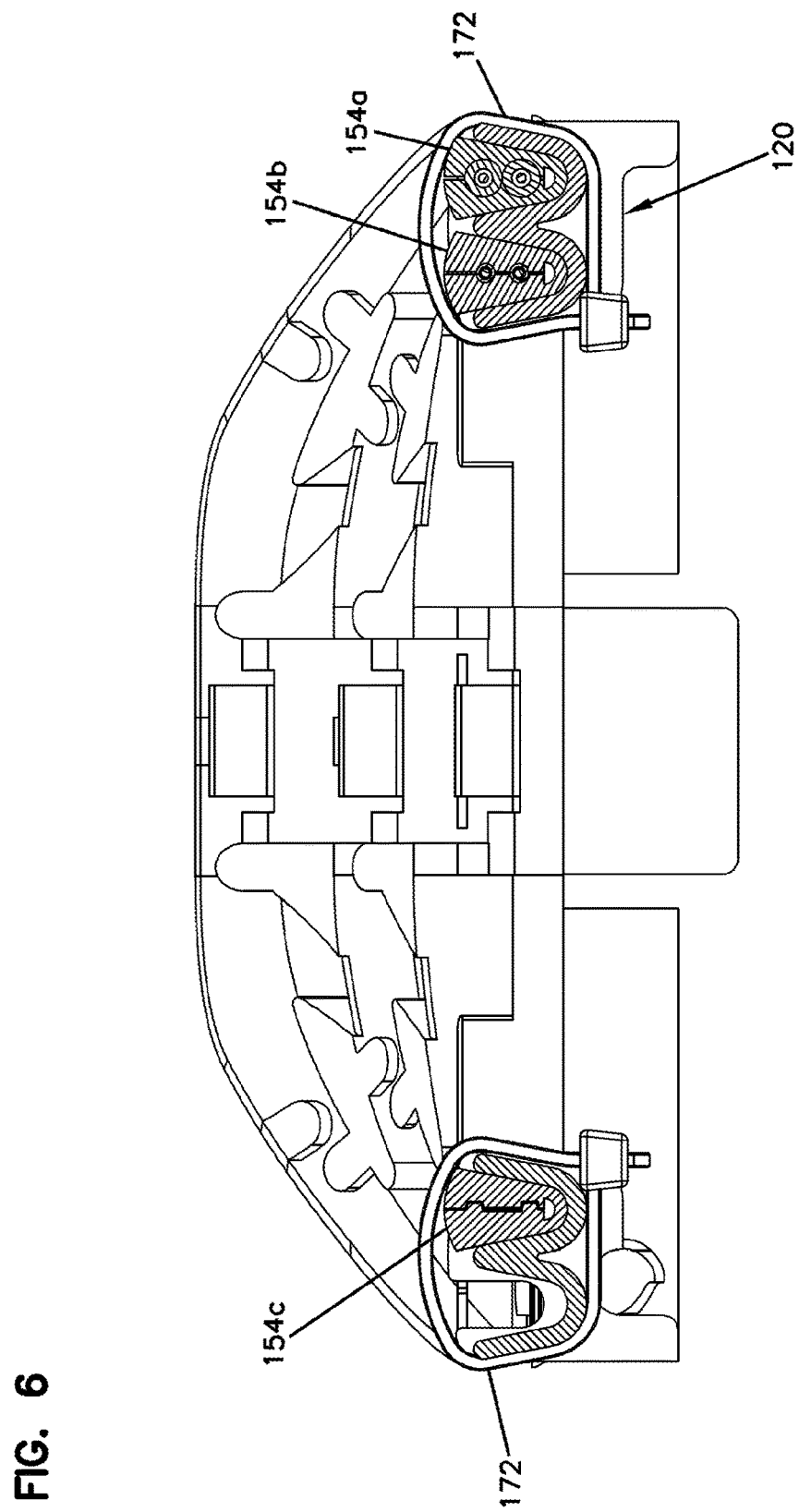
FIG. 6 is a cross-sectional view showing an arrangement in accordance with the principles of the present disclosure for anchoring a protective tube to a tray or other structure.
Figure 6A:
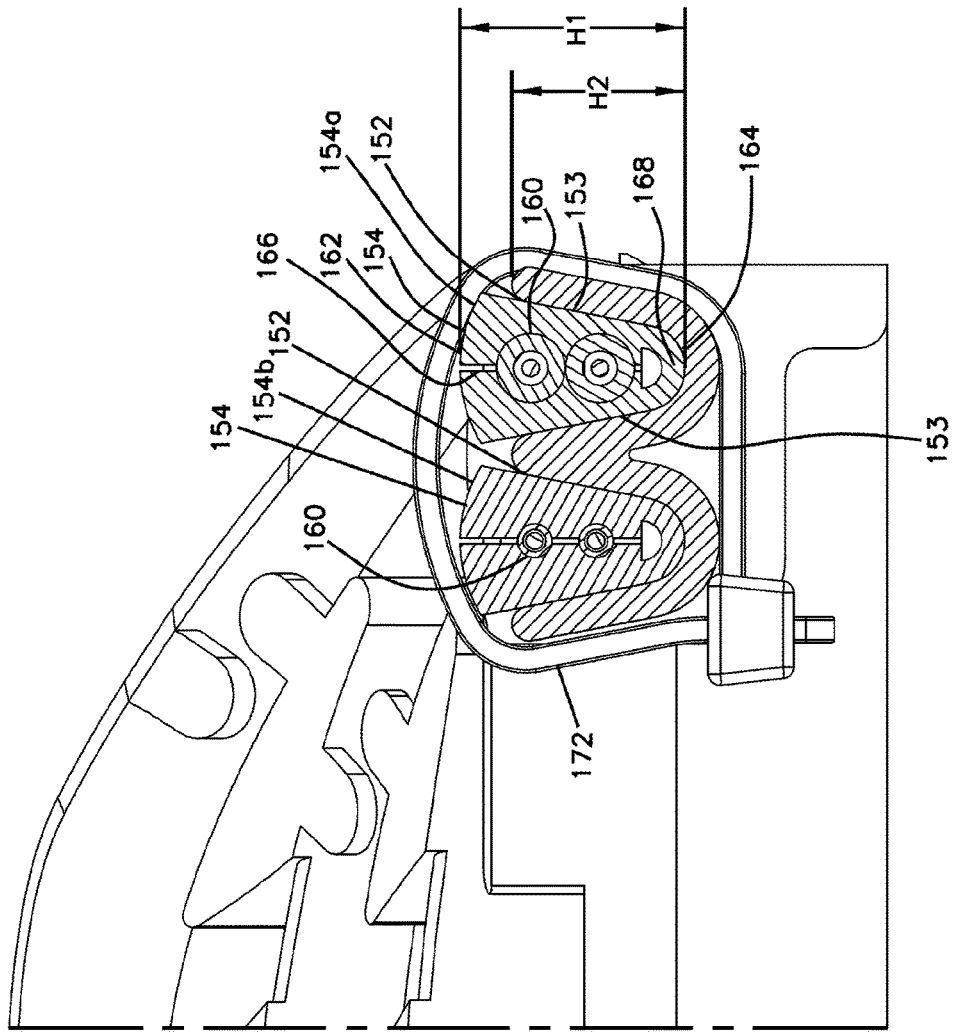
FIG. 6A is an enlarged view of a portion of FIG. 6.
Figure 6B:
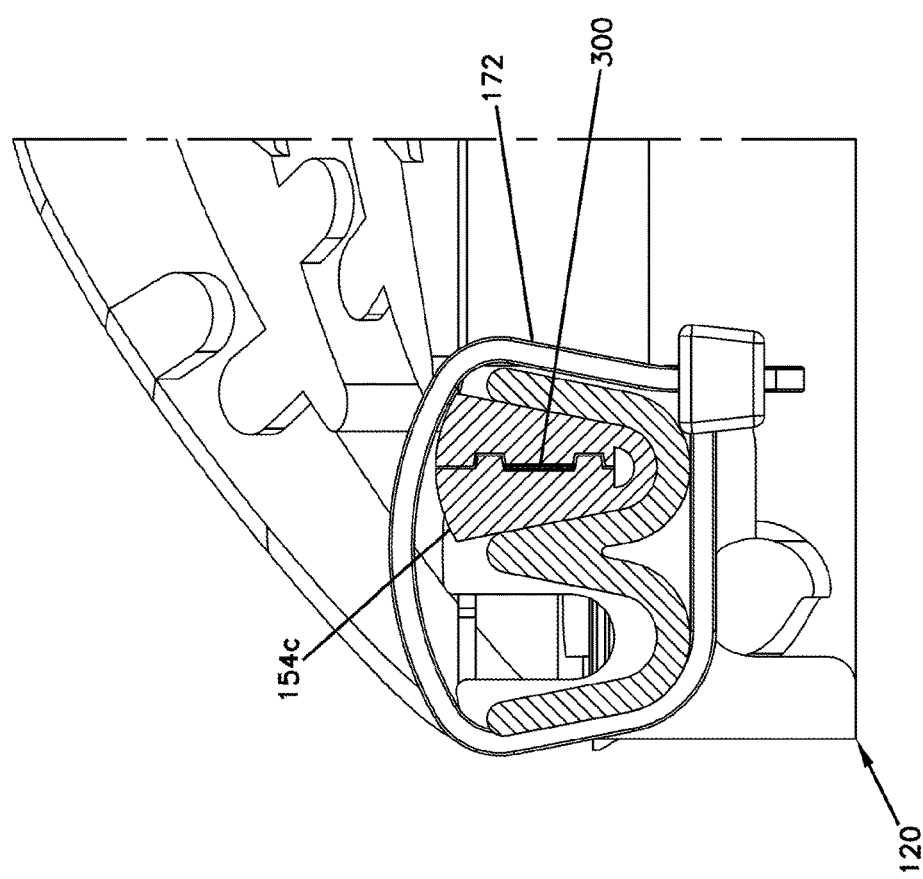
FIG. 6B is an enlarged view of a another portion of FIG. 6.

As shown at FIGS. 5 and 6, the anchoring locations 151 include open-topped pockets 152 defined adjacent the ends of the legs 128. Anchoring grommets 154 are positioned within the pockets 152. In certain examples, the anchoring grommets 154 can be made of an elastomeric/elastic material such as rubber or foam. In certain examples, the anchoring grommets 154 can have a durometer in the range of 40 to 60 Shore A. In certain examples, the anchoring grommets 154 can have a durometer of around 50 Shore A.

Referring to FIGS. 5, 12-14 and 16, the anchoring grommets 154 have first and second opposite axial ends 156, 158. The anchoring grommets 154 also define one or more passages 160 that extend axially through the anchoring grommets 154 from the first axial end 156 to the second axial end 158. In certain examples, the passages 160 can have a transverse cross-sectional shape or profile that generally matches the shape or profile of a protective tube 150 or other protective structure desired to be secured within the anchoring grommet 154. Prior to receiving the protective tubes, the transverse cross-sectional shapes of the passages 160 can be smaller than the transverse cross-sectional shapes of the protective tubes but the elastic construction of the grommets 160 allows the passages 160 top resiliently expand to accommodate the protective tubes. In certain examples, anchoring grommet 154 defines two of the passages 160.

As shown at FIG. 6, each of the anchoring grommets 154 also includes a transverse cross-sectional shape having a first end 162 and an opposite second end 164. The first and second ends 162, 164 are both curved with the first end 162 having a greater radius of curvature as compared to the second end 164. The outer transverse cross-sectional shape of the anchoring grommets 154 tapers inwardly as the shape extends from the first end 162 toward the second end 164 so as to define a general wedge shape. The anchoring grommets 154 also define mid-line slots 166 that extend axially through the anchoring grommets 154 from the first axial ends 156 to the second axial ends 158. When viewed in transverse cross-section, slots 166 have open ends adjacent the first ends 162 of the transverse cross-sectional profile and closed ends positioned near the second ends 164 of the transverse cross-sectional profiles. The slots 166 bisect the passages 160. The anchoring grommets 154 define flex or hinge regions 168 located between the closed ends of the slots 166 and the second ends 164 of the transverse cross-sectional profiles. Hinge regions 168 allow the anchoring grommets 154 to be flexed apart to allow insertion of the protective tubes 150 containing the optical fibers to be downwardly inserted into the passages 160.

Figure 15:
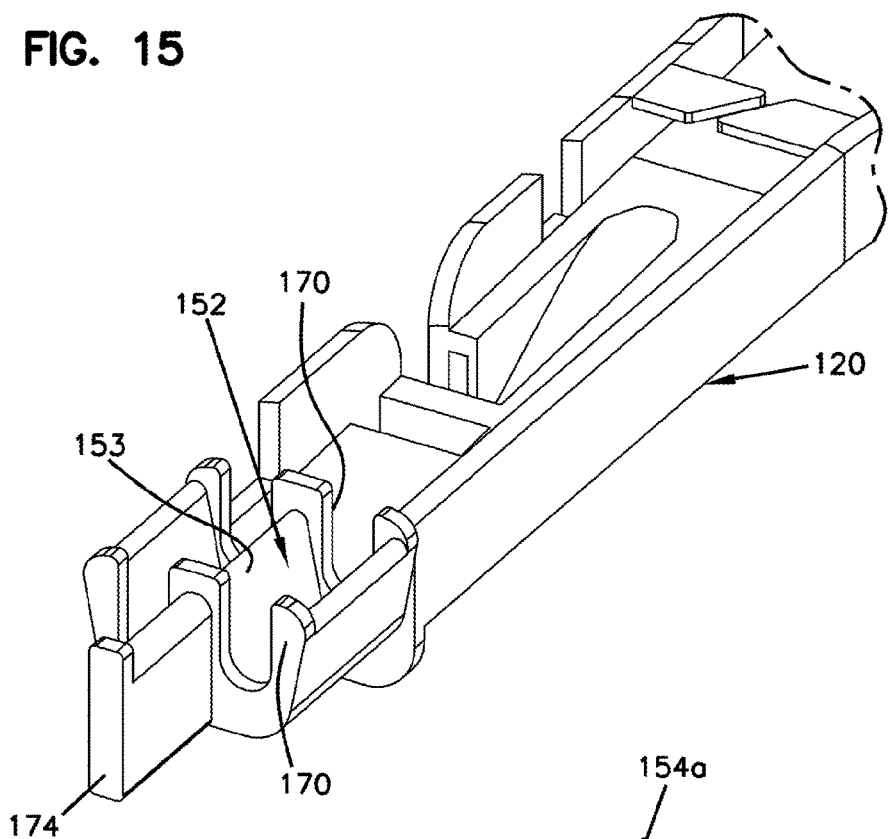
FIG. 15 is an enlarged view of a portion of a base tray of FIG. 5.
Figure 16:
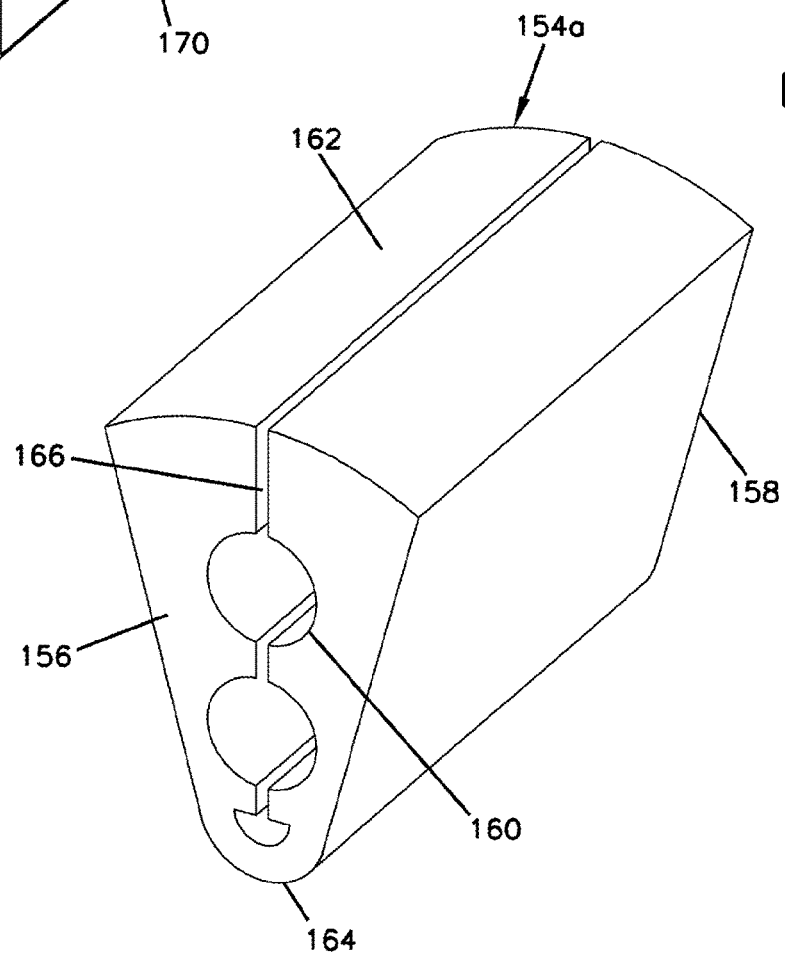
FIG. 16 is an isometric view of the grommet of FIG. 12.
Figure 17:
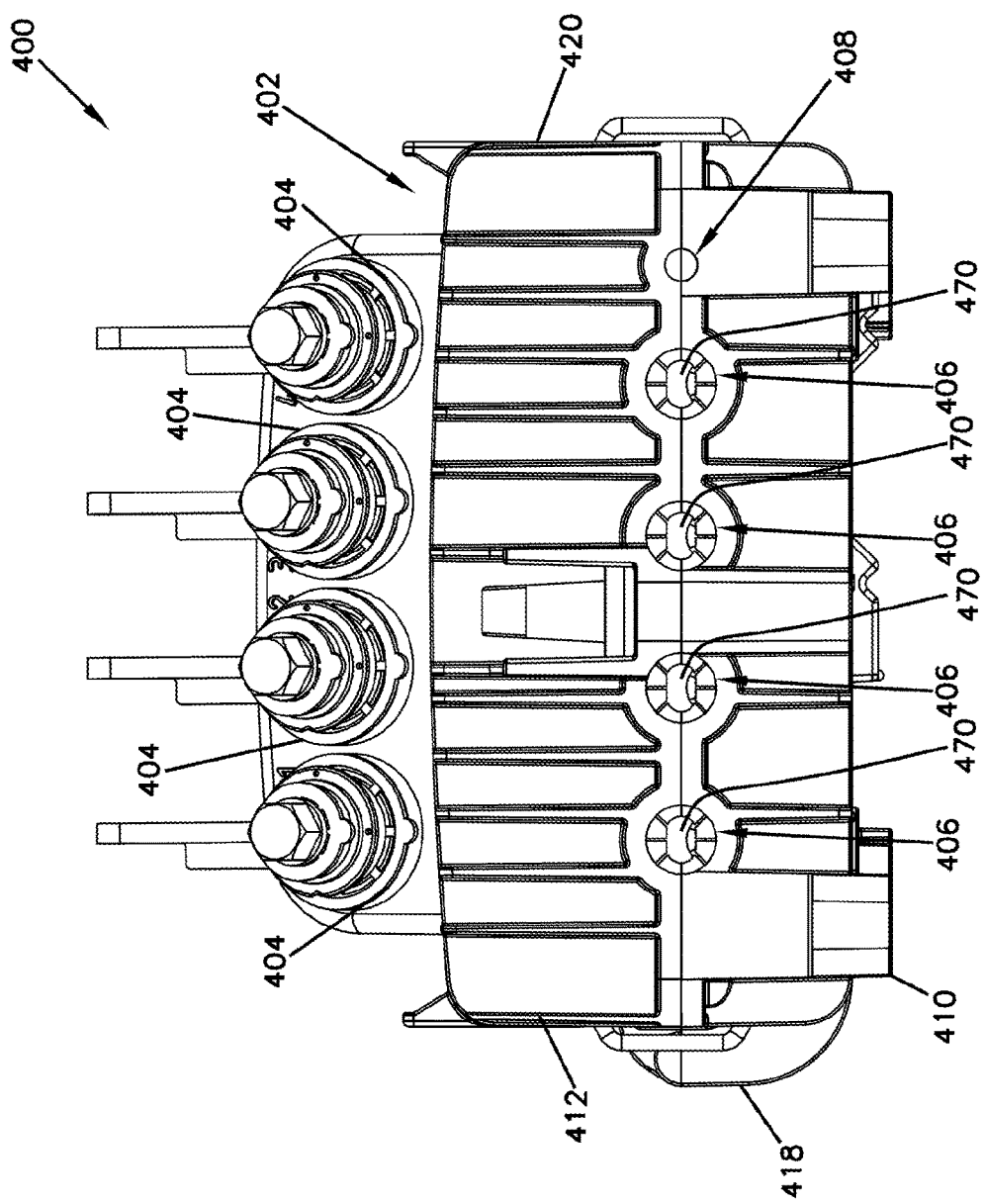
FIG. 17 is a perspective front end view of another optical termination enclosure in accordance with the principles of the present disclosure; the enclosure is shown in a closed position.
Figure 18:
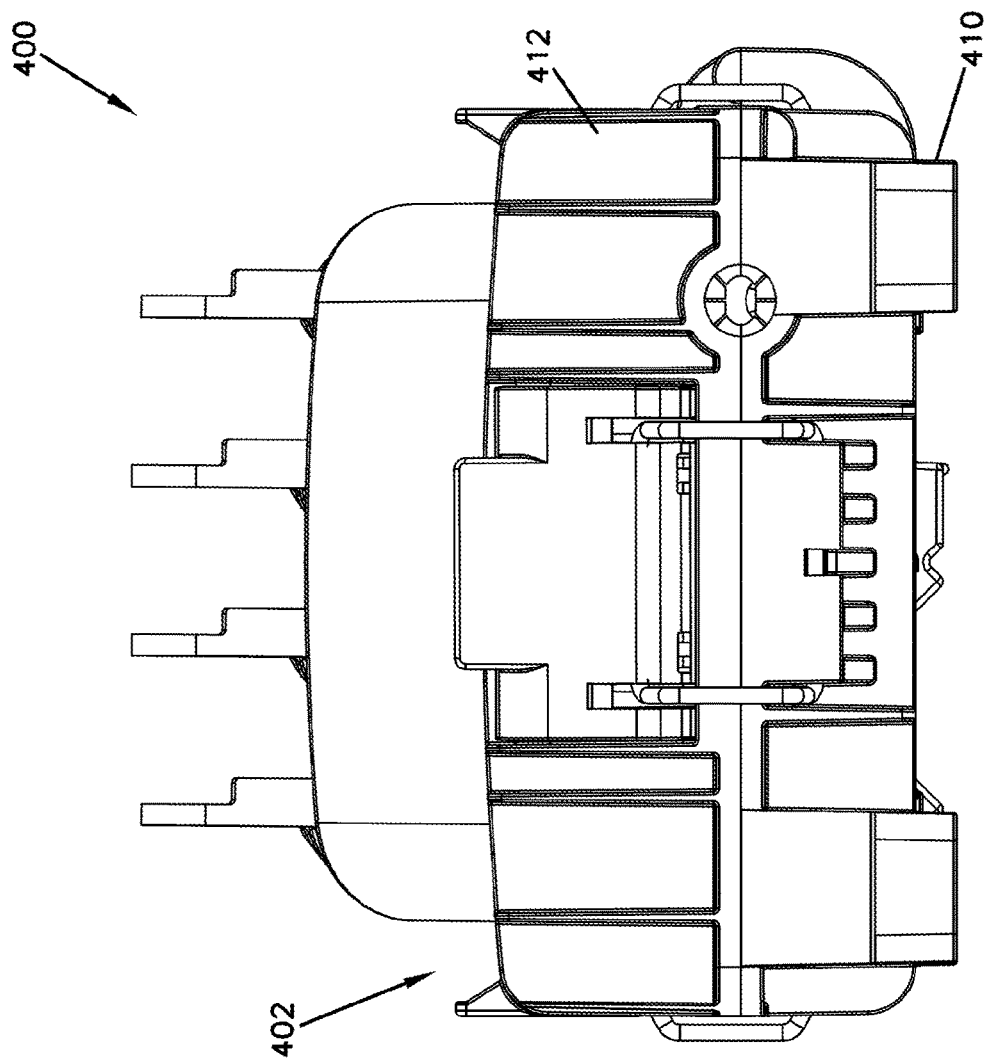
FIG. 18 is a perspective rear end view of the enclosure of FIG. 17.

Referring still to FIG. 6, the pockets 152 define transverse cross-sectional profiles that are tapered to generally match the transverse cross-sectional profiles of the anchoring grommets 154. In the depicted embodiment, the transverse cross-sectional profiles of the pockets 152 include side surfaces 153 that converge as the side surfaces extend in a downward direction. In certain examples, anchoring grommets 54 have a height H1 that is larger than a height H2 of the pockets 152. In this way, the first ends 162 project above the anchoring pockets 152 when the anchoring grommets 154 are mounted therein. The anchoring pockets 152 can also include end walls 170 (see FIG. 15) that oppose portions of the axial ends 156, 158 of the anchoring grommets 154. In this way, the anchoring grommets 154 are axially captured in the pockets 152. The end walls 170 only partially cover the first and second axial ends 156, 158 of the grommets 154 and do not overlap the passages 160. In this way, the end walls 170 do not interfere with the ability to route the protective tubes 150 and the optical fibers through the anchoring grommets 154.

Referring again to FIG. 6, the anchoring grommets 154 are secured within the pockets 152 by strap-like securement structures such as cable ties 172. The cable ties 172 extend over the first ends 162 of the anchoring grommets and around the exteriors of the pockets 152. While tightening the cable ties 172, the anchoring grommets 154 are compressed thereby constricting the passages 160 causing the anchoring grommets 154 to clamp upon the protective tubes 150. The converging side surfaces 153 of the pockets 152 work in combination with the wedge-shaped taper of transverse cross-sectional shape of the grommets 154 to cause compression of the grommets 154 when forced downwardly into the pockets 152 by the cable ties 172. In this way, the protective tubes 150 are anchored within the anchoring grommets 154 by a compressive clamping action of the grommets 154. It will be appreciated that while the protective tubes 150 are clamped within the anchoring grommets 154 the protective tubes are not crushed by the grommets 154. Thus, the optical fibers are not damaged within the protective tubes 150 by the anchoring grommets 154.

For certain applications, additional structure can be provided for tying down protective sleeves or other protective wraps. For example, supplemental tie down structures such as end projections 174 can be provided on the fiber management assembly base 120. As shown at FIG. 5, the supplemental tie down structures can be used to attach structures such as a spiral wrap 175 corresponding to a ribbon cable to the fiber management assembly base 120. The spiral wrap 175 is shown secured to one of the end projections 174 by a strap-like structure such as a cable tie. In the case of a fiber ribbon, the fiber ribbon includes a plurality of optical fibers protected within a polymeric matrix material that encapsulates the optical fibers thereby providing a protective layer surrounding the optical fibers. In certain examples, the anchoring grommets 154 can have passages 160 with generally rectangular cross-sectional profiles suited for receiving and securing the fiber ribbon. Beyond the anchoring grommets 154, the protective coating of the fiber ribbon can be removed such that individual fibers are routed to the fiber management trays 122 for splicing or other operations.

It will be appreciated that the anchoring grommets 154 can have different configurations depending upon the type of feeder cable routed through the optical termination enclosure 20. In this regard, the anchoring grommet 154a is designed for use with larger protective tubes, the anchoring grommet 154b is designed for use with smaller protective tubes and the anchoring grommet 154c is adapted for use with fiber ribbons 300. In a given optical termination enclosure 20, typically only one style of anchoring grommet would be used unless multiple different types of feeder cables are routed through the optical termination enclosure 20. Therefore, the example of FIG. 6 where all three types of anchoring grommets 154a-154c are depicted being used on one fiber management assembly base is mainly for illustration purposes.

Referring to FIG. 4, the cable anchoring and grounding assembly 32 includes a plurality of cable anchoring and grounding units 220 that mount at predetermined locations within the enclosure housing 22. In certain examples, the cable anchoring and grounding units 220 mount within the housing base 34 at predetermined mounting locations. As depicted at FIG. 4, four of the cable anchoring and grounding units 220 are shown mounted at the first end 56 of the enclosure housing 22 in alignment with the cable ports 26 defined at the first end 56 of the enclosure housing 22. Also, one of the cable anchoring and grounding units 220 is shown mounted at the second end 58 of the enclosure housing 22 in alignment with the cable port 26 defined at the second end 58 of the enclosure housing 22. In certain examples, the cable anchoring and grounding units 220 can be pre-assembled outside the interior of the enclosure housing 22 and affixed to a cable outside the interior of the enclosure housing 22. After the cable anchoring and grounding units 220 are assembled and secured to a corresponding fiber optic cable, the cable anchoring and grounding units 220 can be mounted (e.g., secured, latched, affixed, anchored, attached, etc.) within the interior of the enclosure housing 22 at predetermined mounting locations while the corresponding cables remain attached thereto. In certain examples, the cable anchoring and grounding units 220 can be mounted to the enclosure housing 22 by snap-fit connections or by other connection techniques such as fasteners. The ability to secure fiber optic cables to the cable anchoring and grounding units 220 outside the interior of the enclosure housing 22 is advantageous because the various parts can be easily accessed for cable securement without concern for clearance issues. Thereafter, the cable anchoring and grounding units 220 can be mounted within the enclosure housing 22. Since the cables are attached to the cable anchoring and grounding units 220 outside the enclosure housing 22, the cable anchoring and grounding units 220 can be mounted close to one another within the enclosure housing 22 without requiring finger clearance or other types of clearances typically necessary for conventional cable anchors.

Figure 7:
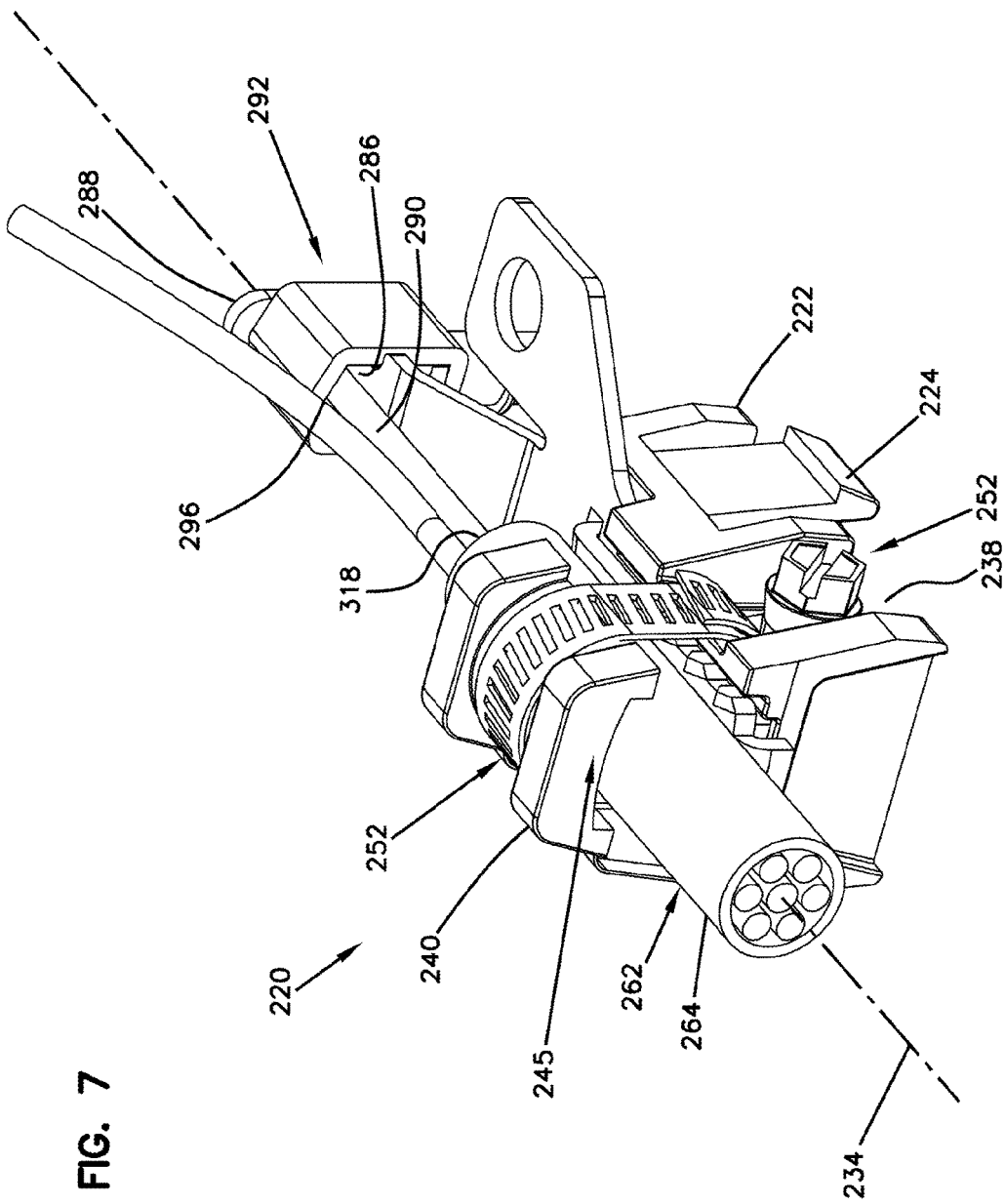
FIG. 7 shows a cable anchoring and grounding unit in accordance with the principles of the present disclosure.
Figure 8:
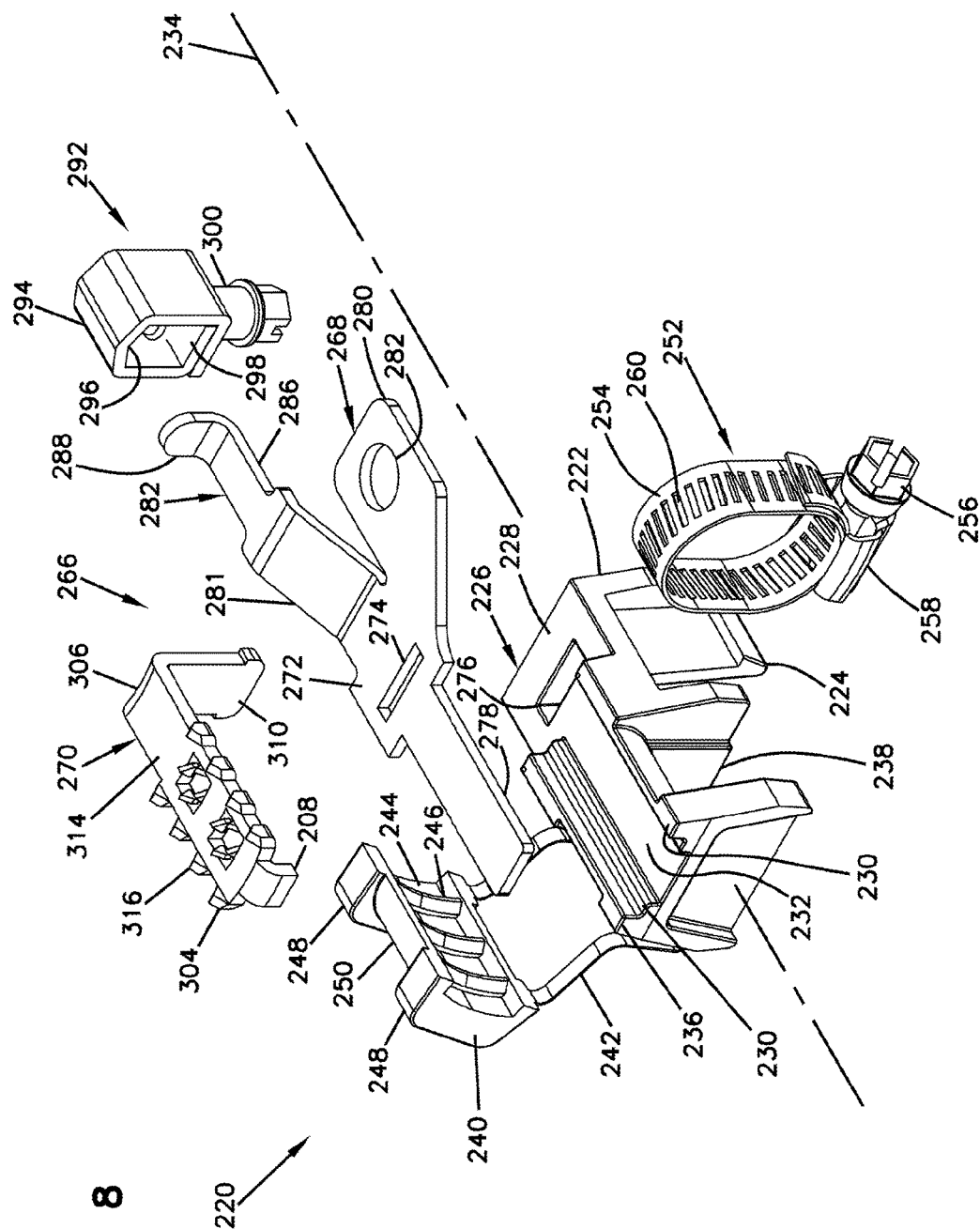
FIG. 8 is an exploded view of the cable anchoring and grounding unit of FIG. 7.

Referring to FIGS. 7 and 8, each of the cable anchoring and grounding units 220 includes an anchor base 222 adapted to be attached to the housing enclosure 22. In the depicted example, the anchor base 222 includes flexible anchoring tabs 224 that engage corresponding components (e.g., shoulders, openings, notches, rails, etc.) provided at predetermined mounting locations within the enclosure housing 22 so as to provide a snap-fit connection between the enclosure housing 22 and the anchor base 222. In this way, the anchor base 222 can be easily and securely affixed to the enclosure housing (e.g., to the housing base 34). In certain examples, anchor base 222 is manufactured from a molded, plastic material.

Referring to FIG. 8, the anchor base 222 includes a top side having a top platform 226. In certain examples, the top platform 226 can include a major, planar surface 228. Elongate side rails 230 can be provided on the planar surface 228. The side rails 230 can be generally parallel and include a stepped configuration. The side rails 230 can cooperate to define an elongate open-topped channel 232 having a length that extends along a cable routing axis 234. A bottom-most surface of the channel 232 is defined by the planar surface 228 of the top platform 226. The side rails 230 define stepped-up surfaces 236 that are elevated relative to the bottom-most surface of the channel 232. The anchor base 220 also includes a bottom side that defines a clearance opening 238 (i.e., a clearance recess) that extends through a width of the anchor base 220 at a location beneath the channel 232.

The cable anchoring and grounding unit 220 also includes a cable cover 240 that is connected to the anchor base 220 by a living hinge 242. The cable cover 240 defines an open-bottomed channel 244 adapted to cooperate with the open-topped channel 232 of the anchor base 222 so as to form a jacket clamp 245 adapted to clamp upon a jacket 264 of a cable 262 routed along the cable routing axis 234 to assist in securing the cable 262 to the cable anchoring and grounding unit 220 (see FIG. 7). A plurality of transverse ribs 246 are positioned within the open-bottomed channel 244. The transverse ribs 246 are transversely oriented relative to the cable routing axis 234. The cable cover 240 also includes strap retaining shoulders 248 positioned at a top side of the cable cover 240. The strap retaining shoulders 248 are spaced-apart along the cable routing axis 234. A strap recess 250 is provided between the strap retaining shoulders 248. The strap recess 250 and the clearance opening 238 cooperate to define a circumferential channel that surrounds jacket clamp 245 and the cable routing axis 234.

Referring to FIG. 8, the cable anchoring and grounding unit 220 also includes a strap-style clamp actuator 252 having a band or strap 254 that is tightened by a bolt 256. The bolt 256 is mounted within a sleeve 258 attached to the strap 254. Threads of the bolt 256 engage corresponding slots 260 in the strap 254 such that the strap 254 is tightened (e.g., cinched) when the bolt 256 is rotated within the sleeve 258 in a first direction, and the strap 254 is loosened when the bolt 256 is rotated in a second direction within the sleeve 258. It will be appreciated that the clamp actuator 254 has the construction of a conventional hose-clamp.

In certain examples, the clamp actuator 254 can be used to affix the cable 262 within the jacket clamp 245 defined by the cable cover 240 and the anchor base 222 by forcing the cable cover 240 and the anchor base 22 together such that the cable is clamped therein between. The strap 254 is routed around the jacket clamp 245 along the circumferential channel defined by the recess 250 of the cable cover 240 and the clearance opening 238 defined through the width of the anchor base 220. The clearance opening 238 also provides space for receiving the sleeve 258 and the bolt 256 of the clamp 254. To secure the cable 262 to the anchor base 222, the cable 262 is first positioned over the top platform 226 so as to extend along the cable routing axis 234. Next, the cable cover 240 is positioned over the top of the cable 262 such that the cable 262 is captured between the cable cover 240 and the open-bottom channel 244 of the anchor base 222. The strap 254 of the clamp actuator 252 is positioned around the jacket clamp 245. The clamp actuator 252 is tightened by turning the bolt 256 such that the strap 254 constricts thereby compressing the cable 262 between the open-top channel 232 of the anchor base 222 and the open-bottom channel 244 of the cable cover 240. The transverse ribs 246 can embed within a jacket 264 of the cable 262 to provide enhanced axial retention of the cable 262. The jacket clamp 245 forms a jacket anchoring location of the cable anchoring and grounding unit 220.

The cable anchoring and grounding unit 220 also includes a plate arrangement 266. The plate arrangement 266 includes a bottom plate 268 and a top plate 270. In certain examples, the top and bottom plates 268, 270 are constructed of an electrically conductive material such as metal. In certain examples, the plate arrangement 266 can provide a number of different functions. In one example, the plate arrangement 266 can include one or more structures that provide enhanced retention of the cable 262 with respect to the anchoring base 222. In another example, the plate arrangement 266 can include structure for making an electrical connection with a conductive shield of the cable 262, and for making an electrical connection to ground.

The bottom plate 268 of the plate arrangement 266 includes a lower section 272 that is generally planar and that includes a portion that seats upon the top platform 226 of the anchor base 222. The lower section 272 defines a through-slot 274 that aligns with a corresponding opening 276 defined by the top platform 228 of the anchor base 222. The lower section 272 also includes a strip portion 278 that extends through the channel 232 between the side rails 230 of the anchor base 222. The lower section 272 further includes a grounding tab 280 that defines an opening 282 for receiving a fastener used to electrically connect the grounding tab 280 to a grounding strip or other grounded structure provided within the enclosure housing 22. In certain examples, the grounding strip or other grounding structure can be electrically connected to a grounding wire routed into the interior of the enclosure housing 22 through the grounding cable port 28.

The bottom plate 268 also includes an upper section 282 connected to the lower section 272 by a ramp section 281. The upper section 282 includes a finger section 286 and a stop section 288. The stop section 288 projects upwardly from the finger section 286 and forms a positive stop against which a strength member 290 of the cable 262 can abut. A strength member clamp arrangement 292 is configured to mount on the upper section 282. The strength member clamp arrangement 292 includes a clamp housing 294 through which the finger section 286 extends. The clamp housing 294 includes an upper clamping region 296 having a generally V-shaped transverse cross-section. The clamp housing 294 also includes a bottom wall 298 through which an actuating element such as a fastener 300 extends. In one example, the fastener 300 is a bolt or a screw having threads that engage corresponding threads defined in the bottom wall 298. When the fastener 300 is threaded in a first direction with respect to the bottom wall 298, a free end of the fastener 300 moves towards the clamping region 296. By threading the fastener 300 in an opposite direction, the free end of the fastener 300 moves away from the clamping region 296. As shown at FIG. 7, the strength member clamp arrangement 292 is used to clamp the strength member 290 of the cable 262.

In certain examples, the jacket 264 of the cable 262 is clamped at the jacket anchoring location defined by the jacket clamp 245 and the strength member 290 is clamped at the strength member clamp arrangement 292. As depicted in FIG. 7, the jacket 264 terminates at an end of the jacket clamp 245 and the strength member 290 extends beyond the jacket clamp 245 to a strength member clamping location defined by the strength member clamp arrangement 292. In certain examples, an end of the strength member abuts against the stop section 288. In certain examples, the strength member 290 is relatively stiff and can have a construction that includes a glass-reinforced polymer such as fiberglass reinforced epoxy. As shown at FIG. 7, the strength member fits between the clamping region 296 of the clamping housing 294 and the finger section 286 of the upper section 282 of the bottom plate 268. By tightening the fastener 300, strength member 290 is clamped between the finger section 286 and the clamping region 296.

The top plate 270 includes a first end 304 and an opposite second end 306. A downward tab 208 is positioned at the first end 304 and a downward extension 310 is positioned at the second end 306. When the cable anchoring and grounding unit 220 is assembled, the bottom plate 268 is positioned on the top platform 226 and the top plate 270 mounts over the bottom plate 268. Preferably, the top and bottom plates 266, 268 are in contact with one another so that an electrical connection is made between the top and bottom plates 268, 270. With the top plate 270 mounted on the bottom plate 268, the downward tab 308 extends downwardly beyond the bottom plate 268 and opposes an end wall 312 of the anchor base 222. The downward extension 310 extends through the through slot 274 of the bottom plate 268 and also through the opening 276 in the top platform 226 of the anchor base 222. Preferably, the downward extension 310 is configured to make a snap-fit connection or other type of connection with the anchor base 222.

Referring again to FIG. 8, the bottom plate 268 includes a main section 314 that extends between the first and second ends 304, 306. A plurality of projections 316 project upwardly from the main section 314. In certain examples, projections 316 are configured to embed within the jacket 364 of the cable 362 when the cable 262 is clamped at the jacket anchoring location. In this way, the projections 316 can assist in enhancing the anchoring effect provided by the jacket anchoring location. Additionally, when the cable 362 is a shielded cable, the projections 316 can penetrate completely through the jacket 264 so as to engage and make electrical contact with the shield layer of the cable 262. In this way, the projections 316 allow the shield layer to be electrically connected to the plate assembly 266 for grounding purposes.

Figure 9:
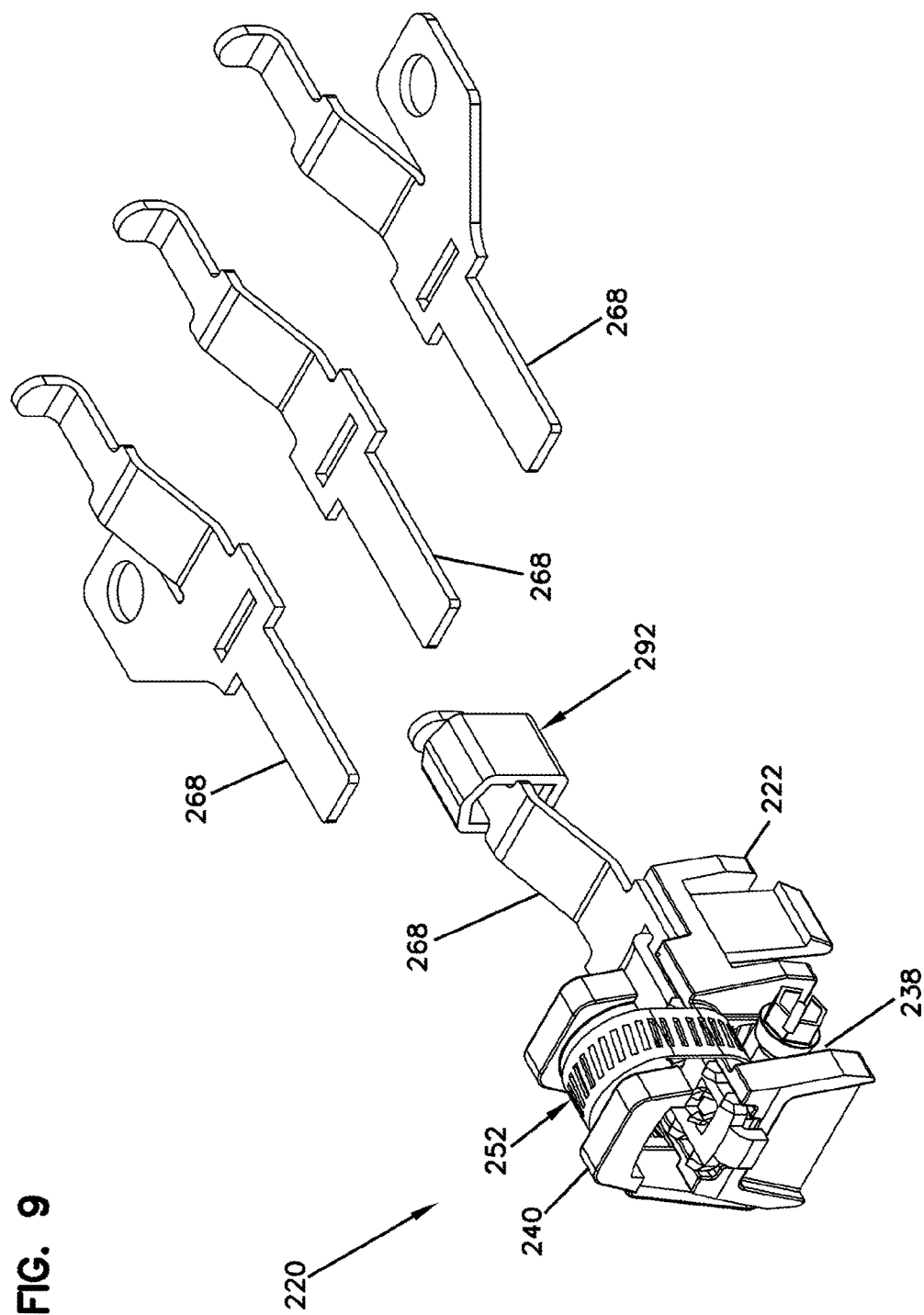
FIG. 9 shows the cable and anchoring unit of FIG. 7 with interchangeable plates that allow the cable and anchoring unit to be customized for left side grounding, right side grounding, or no grounding.

Referring to FIG. 9, it will be appreciated that different bottom plates 268 can be utilized to allow the cable anchoring and grounding unit 220 to be customized for a certain application. For example, for design flexibility, bottom plates 268 can be provided with grounding tabs on either the left or right side. Additionally, for applications where grounding is not necessary (e.g., for cables with no shielding), a bottom plate without a grounding tab can be utilized.

In use optical termination enclosure 20, a feeder cable 262 is initially processed (e.g. the jacket is ring cut) to remove a portion of the jacket thereby exposing the interior fibers and also exposing a section of the strength member 290. The strength member 290 is trimmed to a desired length relative to an end 318 of the jacket 264 corresponding to an entrance section of the feeder cable 262. The entrance section of the cable 262 enters the optical termination enclosure 20 through one of the cable ports 26. The length of the strength member 290 is selected such that an end of the strength member 290 abuts against the stop section 280 when an entrance section of the cable 262 is positioned within the open-topped channel of the anchor base 222. With the entrance section of the cable 262 positioned along the cable routing axis within the open-topped channel of the cable base 222, the cable cover 240 is pivoted to a position where the cable is captured between the cable cover 240 and the top platform 226 of the anchor base 222. The clamp actuator 250 is then mounted around the cable cover 240 and the anchor base 220 and tightened to clamp the end of the cable entrance section of the cable 262 within the jacket clamp 245. As the clamp 252 is tightened, the projections 216 embed in the jacket 264 and make electrical contact with a shield of the cable 262. With the cable jacket clamped by the jacket clamp 245, an end portion of the strength member of the cable 262 is positioned at the strength member clamping location within the clamp housing 294. By tightening the fastener 300, the strength member 290 is clamped in place at the strength member clamping location. As previously described, the strength member can be clamped between the clamping region 296 of the clamp housing 294 and the finger section 286. Once the cable 262 is fully secured to the cable anchoring and grounding unit 220, the cable anchoring and grounding unit 220 can be mounted (e.g., snap-fitted) at a predetermined mounting location within the enclosure housing 222. Thereafter, the grounding tab 280 can be electrically connected to a grounding strip provided within the enclosure housing 22 to provide grounding of the cable 262.

Fibers desired to be accessed within the enclosure can be routed from the corresponding cable anchoring and grounding unit 220 to the fiber management assembly 30. In certain examples, the fibers desired to be accessed at the fiber management assembly 30 can be protected within the protective tubes 150 that are routed from the corresponding cable anchoring and grounding unit 220 to the fiber management assembly 30. The protective tubes 150 can be anchored to the fiber management assembly 30 by the grommets 154. Fibers that are passed through the enclosure without being accessed/terminated can have excess fiber length stored in a fiber management loop beneath the fiber management assembly 30. The fibers can exit the optical termination enclosure 20 via an exit cable section of the cable 262 that is routed through another one of the cable ports 26. The exit cable portion of the cable 262 can be anchored to the enclosure by another one of the cable anchoring and grounding units 220 in the same manner described above with respect to the entrance cable section of the cable 262.

Referring to FIGS. 17-20, another example optical termination enclosure 400 is depicted in accordance with the principles of the present disclosure. The optical termination enclosure 400 includes an enclosure housing 402 which is preferably re-enterable and environmentally sealed. The optical termination enclosure 400 further includes a plurality of ruggedized connector ports 404 adapted for receiving ruggedized connectors. In certain examples, the ruggedized connectors are mounted at the ends of drop cables routed to subscriber locations. The ruggedized connector ports 404 are preferably environmentally sealed. The optical termination enclosure 400 also includes a plurality of cable ports 406 for allowing fiber optic cables to be routed into and out of the enclosure housing 402. Preferably, the cable ports 406 provided sealed interfaces with the fiber optic cables routed there through. In certain examples, the fiber optic cables can be routed in a straight pass-through configuration or in a butt-style pass-through configuration. The optical termination enclosure 400 further includes a grounding cable port 408 for receiving a grounding cable in a sealed manner.

Figure 19:
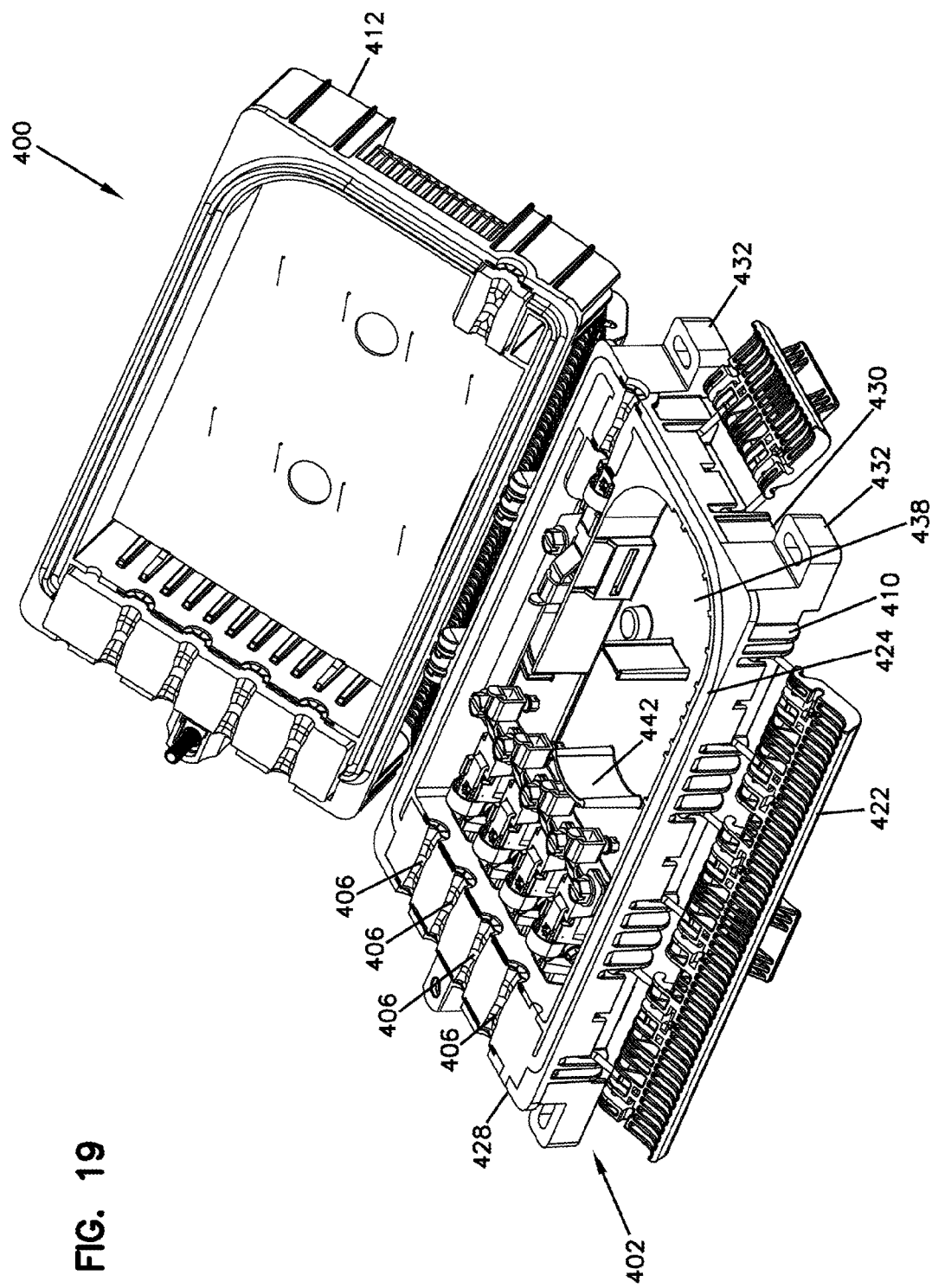
FIG. 19 is perspective view of the enclosure of FIG. 17 in an open position.
Figure 20:
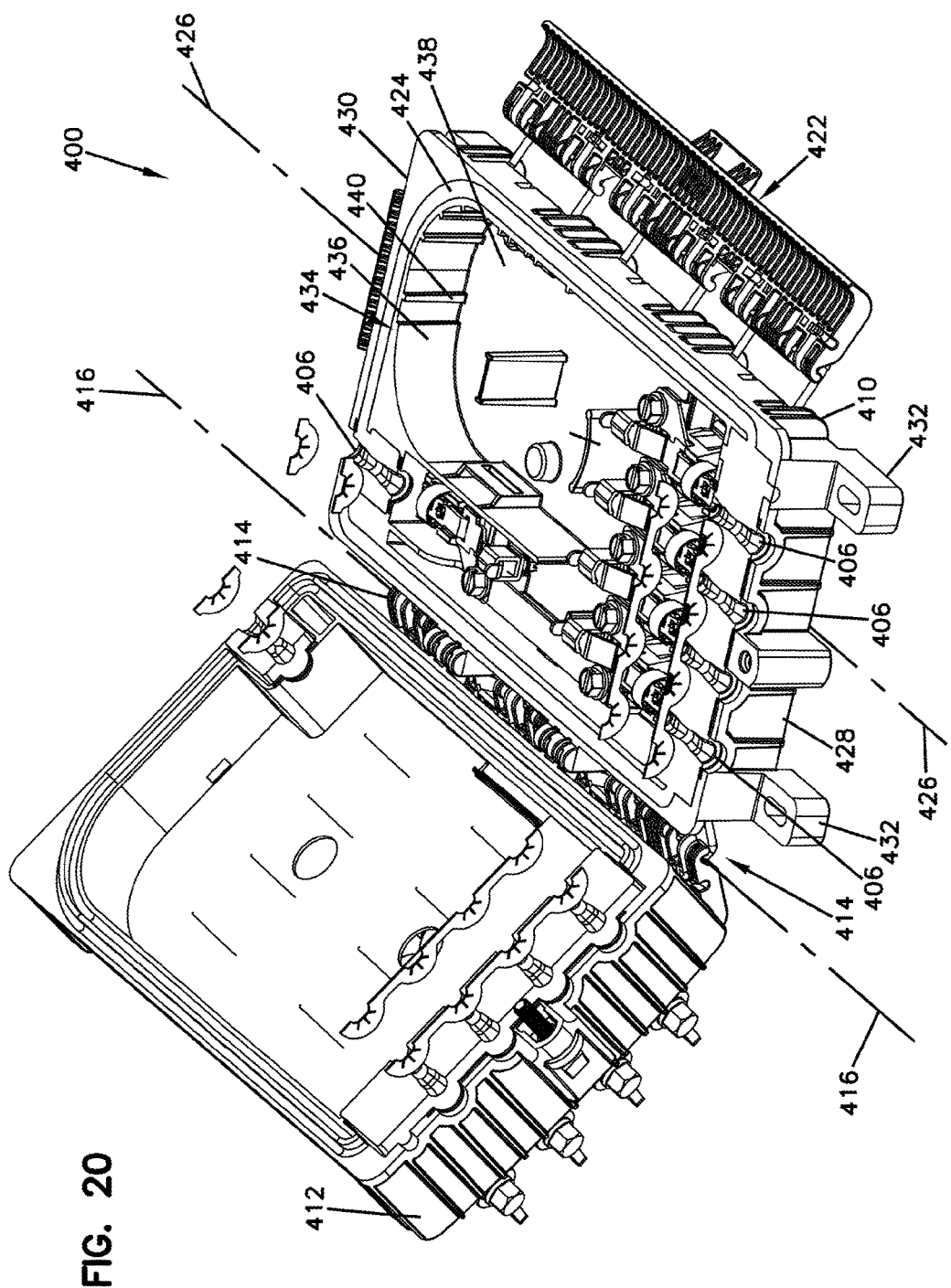
FIG. 20 is a front perspective view of the enclosure of FIG. 19 depicting a cable insert assembly in accordance with the principles of the present disclosure.

Referring still to FIGS. 19 and 20, the enclosure housing 402 of the optical termination enclosure 400 includes a housing base 410 pivotally connected to a housing cover 412 by a hinge 414. The hinge 414 allows the housing base 410 and the housing cover 412 to pivot relative to one another about a pivot axis 416 between a closed configuration (see FIG. 17) and an open position (see FIG. 20). The enclosure housing 402 includes a first side 418 (see FIG. 17) and an opposite second side 420. The hinge 416 extends along the first side 418 of the enclosure housing 402 and a latch 422 is provided at the second side 420 of the enclosure housing 402. The latch 422 is configured to retain the housing base 410 and the housing cover 412 in the closed configuration of FIG. 17. By opening the latch 422, the enclosure housing 402 can be moved to the open configuration of FIG. 20.

In certain examples, the enclosure housing 402 is environmentally sealed and adapted for outdoor use. Similar to the enclosure housing 22 shown in FIG. 2, the enclosure housing 402 can also include a perimeter seal (not shown) for providing environmental sealing between the housing base 410 and the housing cover 412 when the enclosure housing 402 is in the closed configuration. The perimeter seal can be mounted within a perimeter channel 424 defined by the housing base 410. The perimeter seal may flow/deform to fill voids within the perimeter channel 424 to form the peripheral seal of the enclosure housing 402, and to form seals around any cables positioned within cable ports 406.

Referring to FIG. 20, the enclosure housing 402 can be elongated along a housing axis 426. The housing axis 426 can extend between opposite first and second ends 428, 430 of the enclosure housing 402. The cable ports 406 as well as the cable grounding port 408 are provided at the first end 428 of the enclosure housing 402. At least one of the cable ports 406 can also be provided at the second end 430 of the enclosure housing 402. In certain examples, the cable ports 406 can be configured for routing a feeder cable into and out of the enclosure housing 402. In a butt-style pass-through configuration, a feeder cable enters the enclosure housing 402 through one of the cable ports 406 at the first end 428 of the enclosure housing 402 and exits the enclosure housing 402 through another one of the cable ports 406 at the first end 428 of the enclosure housing 402. In a straight pass-through configuration, the feeder cable enters the enclosure housing 402 through one of the cable ports 406 at the first end 428 of the enclosure housing 402 and exits the enclosure housing 402 through the cable port 406 at the second end 430 of the enclosure housing 402. Within the enclosure housing 402, at least one of the optical fibers of the feeder cable is accessed. In certain examples, the portion of the feeder cable positioned within the enclosure housing 402 has the jacket removed to facilitate accessing the optical fibers.

The housing base 410 of the enclosure housing 402 can include structure for mounting the optical termination enclosure 400 in the field. In certain examples, the optical termination enclosure 400 can be mounted aerially or underground. In certain examples, the housing base 410 can include mounting tabs 432 for use in mounting the optical termination enclosure 400 to a wall of a handhole, to a post, to a pole or to another structure with the use of fasteners, straps, ties, or other structures. In certain examples, the optical termination enclosure 400 can further include a bracket or other structure having openings that facilitate mounting the optical termination enclosure 400 to a self-supporting aerial cable or other structure via the fastening elements such as straps, ties, or other fasteners.

The housing base 410 can include a cradle 434 for receiving and mounting the fiber management assembly 30. The cradle 434 can include a cradle wall 436 arranged in a generally U-shaped configuration. The cradle wall 436 projects forwardly from a rear wall 438 of the housing base 410. A plurality of support columns 440 also project forwardly from the rear wall 438. The support columns 440 are positioned along an inner side of the cradle wall 436. The housing base 410 can also include a fiber bend radius limiter 442 (e.g., a curved fiber guide wall) that projects forwardly from the rear wall 438.

Figure 21:
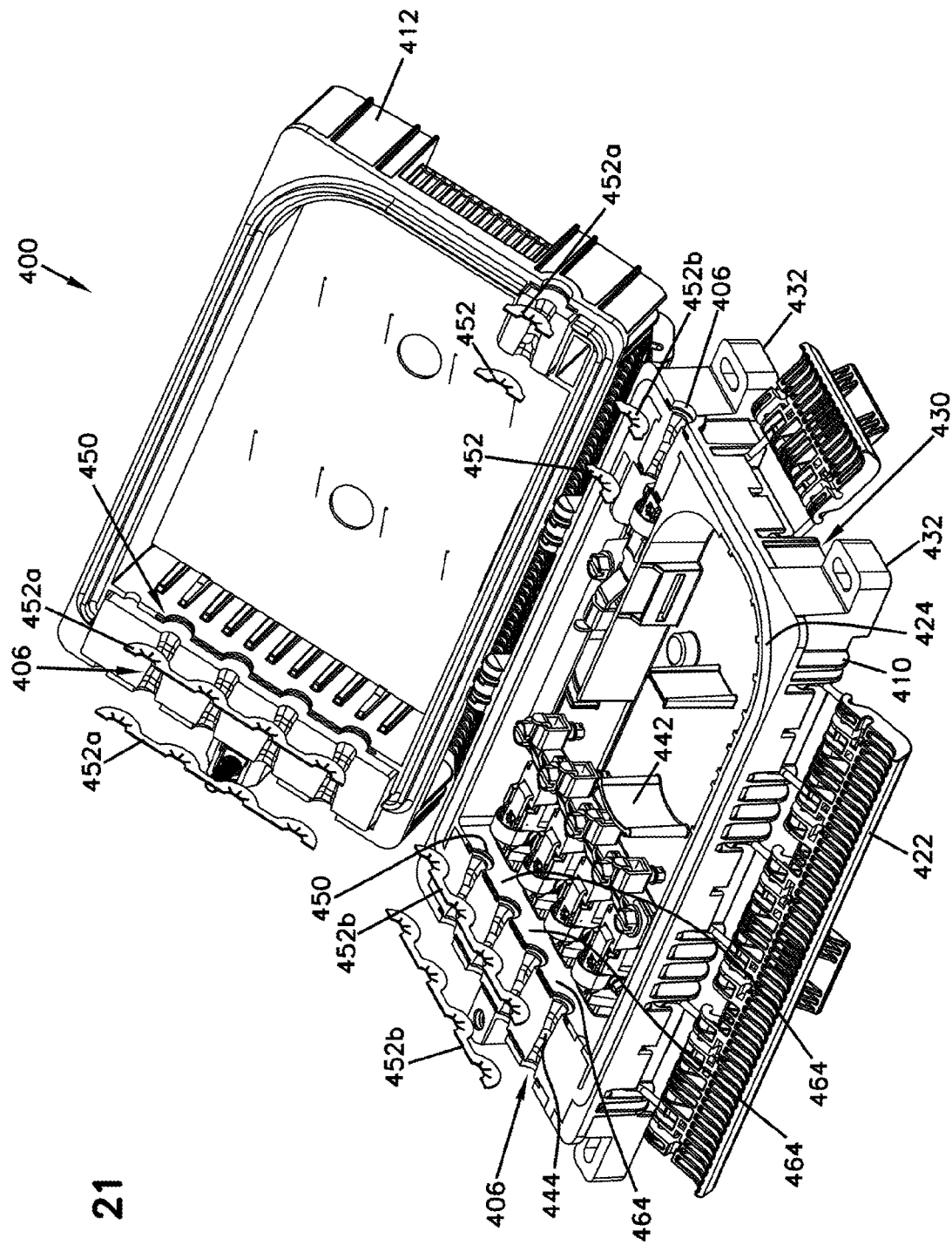
FIG. 21 is rear perspective view of the enclosure of FIG. 20.
Figure 22:
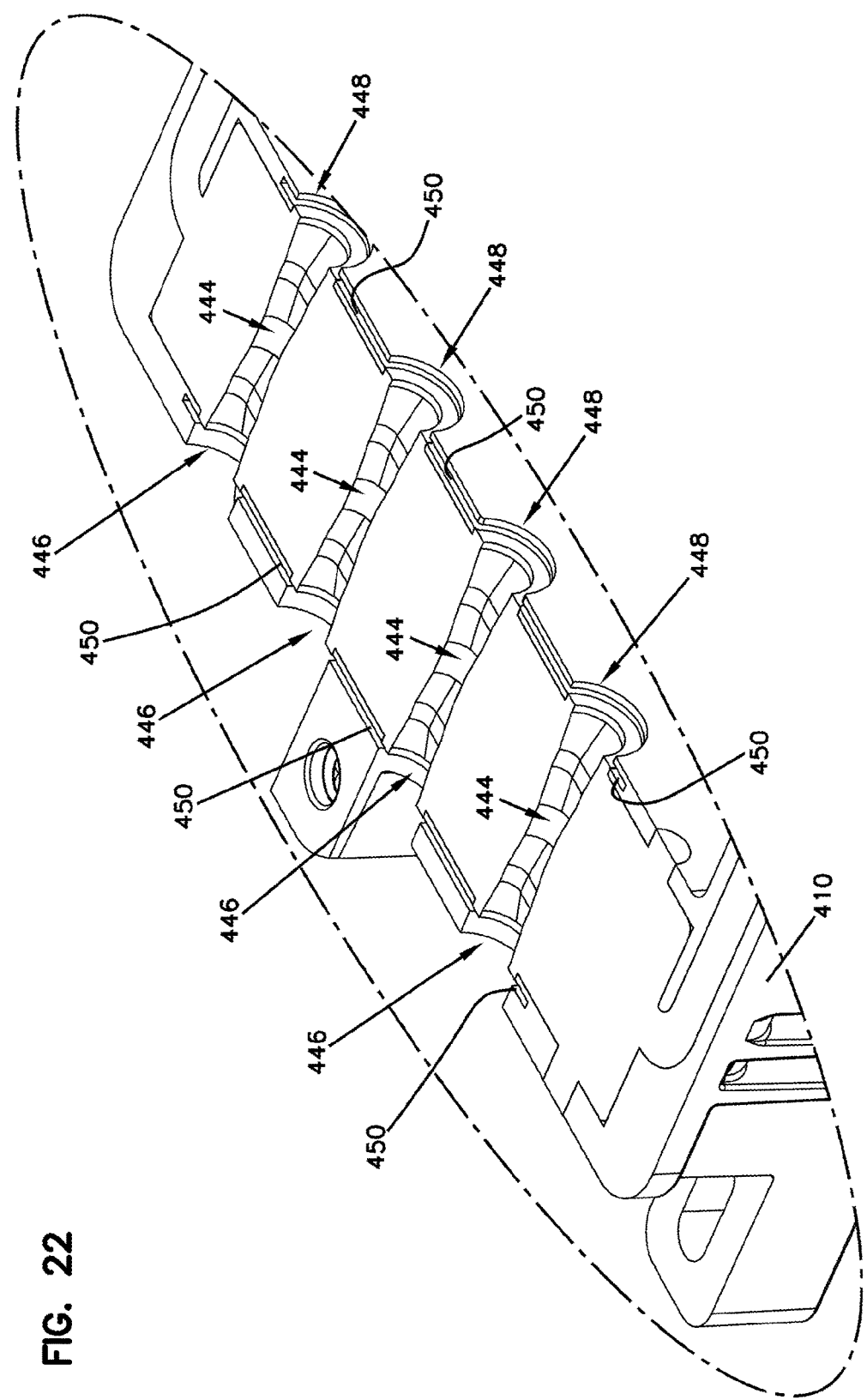
FIG. 22 is an enlarged view of a portion of the enclosure of FIG. 19.

Referring to FIGS. 21 and 22, each of the cable ports 406 define passages 444 that extend between opposite ends 446, 448 thereof. Cables can be routed through the passages 444 of the cable ports 406 and are sealed thereabout. In one example, the housing base 410 and the housing cover 412 each define recesses 450 at the opposite ends 446, 448 of the cable ports 406. The recesses 450 in both the housing base and cover 410, 412 are structured to receive a cable insert assembly 452. The cable insert assembly 452 is formed of a polymeric material that provides flexibility when placed within a rigid housing. The cable insert assembly 452 can include first insert members 452a and second insert members 452b. The first insert members 452a can be located in the cover 412 and the second insert members 452b can be located in the base 410.

Figure 23:
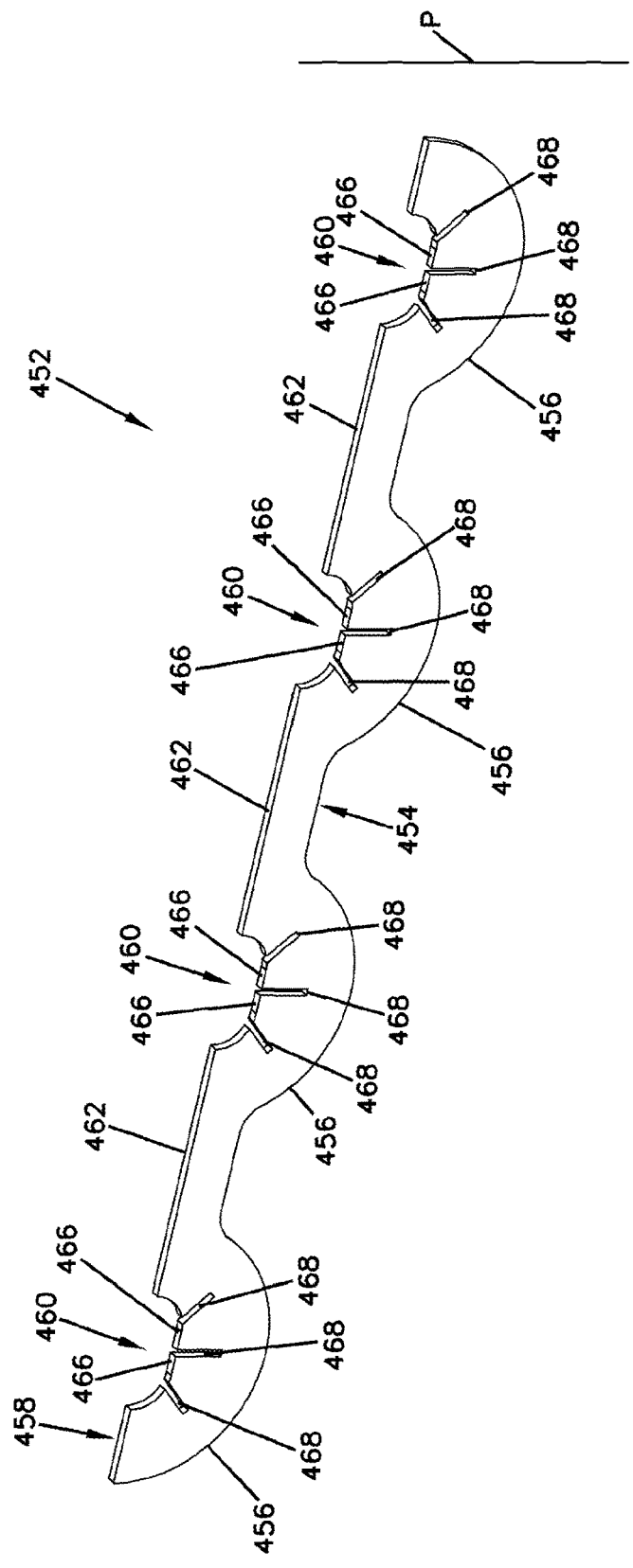
FIG. 23 is a perspective view of the cable insert assembly of FIG. 20.

Referring to FIG. 23, an enlarged view of the cable insert assembly 452 is shown. The cable insert assembly 452 includes a main body frame 454 with a bottom side 456 and a top side 458. In the depicted example, the top side 458 of the main body frame 454 of the insert assembly 452 defines cutouts 460 that align with cable ports 406 when the insert assembly 452 is inserted within recesses 450 to form respective seals.

In the example shown, the insert assembly 452 includes four cutouts 460 designed as half-circle segments, although alternatives are possible. As noted above, the cable insert assembly 452 is positioned in both the cover 412 and the base 410. When the housing cover 412 and the housing base 410 are mated together each of the respective cutouts 460 of half-circles of the first and second insert members 452a, 452b can mate or be fitted together one on top of the other, which has the effect of respectively completing a full circle or cable insertion opening 470 (e.g., port openings). Again, each of the cutouts 460 are configured to align with a respective one of the cable ports 406 to provide a seal about a cable.

As shown, the cutouts 460 defined in the insert assembly 452 are separated by intermediate portions 462 of the insert assembly 452. The intermediate portions 462 connecting the cutouts 460 of the insert assembly 452 together as one single piece. The depicted insert assembly 452 is designed for four parallel cable lead-ins.

Figure 24:
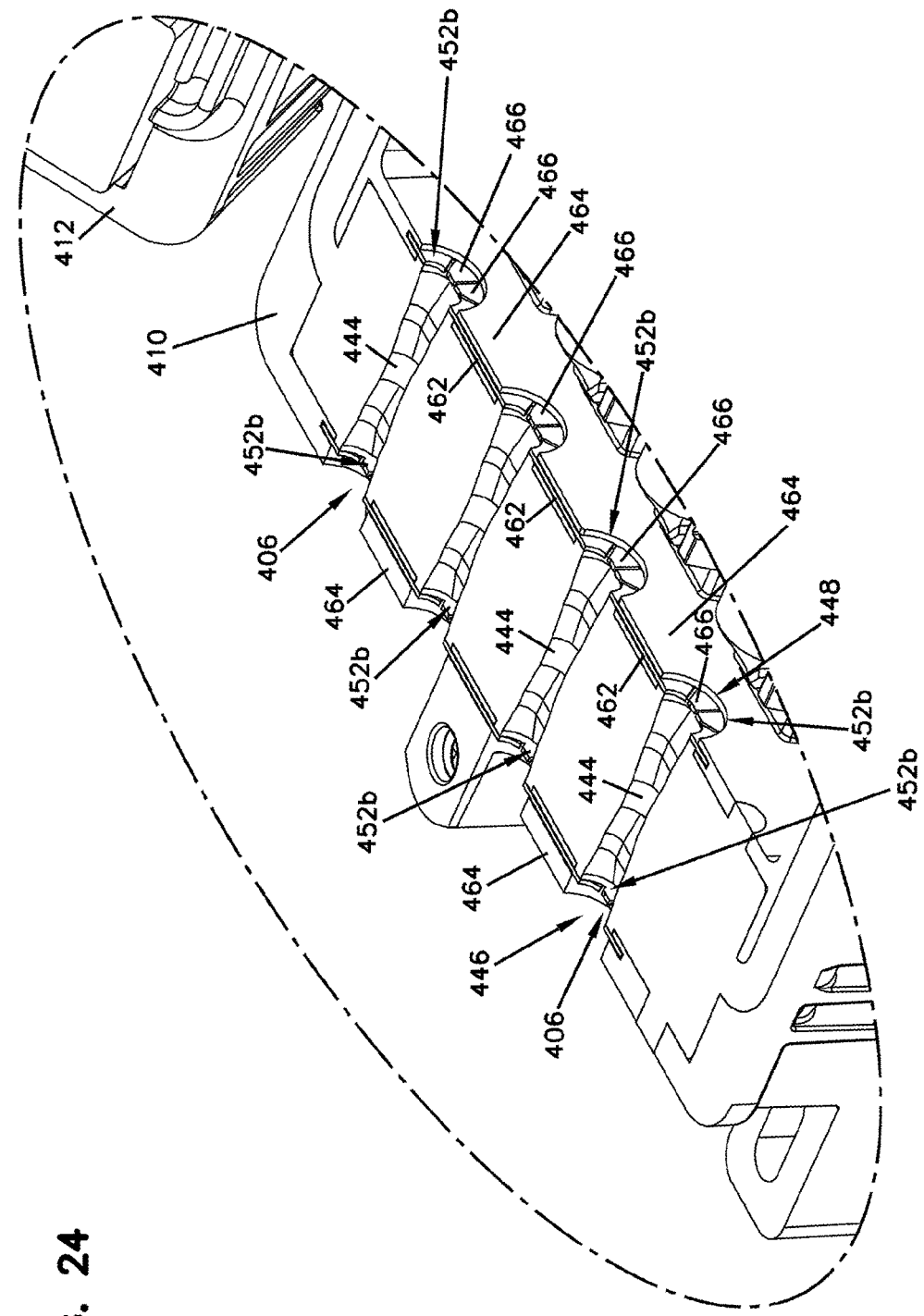
FIG. 24 is an enlarged view of the portion of the enclosure of FIG. 22 showing the cable insert assembly mounted in the enclosure.

Recesses 450 and bottom sides 456 of the insert assembly 452 both include intermating rounded profiles to allow the insert assembly 452 to be inserted within recesses 450 adjacent cable ports 406 as shown in FIG. 24. The intermediate portions 462 of the insert assembly 452 align with portions 464 of the housing base 410 when the insert assembly 452 is inserted in recesses 450. The portions 464 of the housing base 410 are located between each of the cable ports 406.

The cable insert assembly 452 includes a plurality of fingers 466 that are formed in each of the cutouts 460 to help form a seal. For example, a plurality of slits can be defined in each one of the at least one half-circle segment of the first and second insert members 452a, b to form the plurality of fingers 466. The plurality of fingers can extend in a first, single plane orientation P, as the cable is inserted in the cable insertion opening 470. The fingers 466 are all shown lying in the first, single plane orientation P and radiating outward.

The fingers 466 are separated by slits 468 such that the fingers 466 flex upon insertion of a cable therein. The plurality of fingers 466 can flex to extend in a second orientation to form a seal about the cable as the cable is inserted. For example, the fingers 466 can flex inwardly in the second orientation such that the second orientation is substantially perpendicular to the first, single plane orientation as the cable is inserted through the cable insertion opening.

In addition to different opening counts, the insert assembly 450 can have different opening sizes and different opening shapes to accommodate different cable types. The insert assembly 452 can be used to allow cables to be inserted through various size port openings. When the housing cover 412 is pivoted closed onto the housing base 410, the insert assemblies 452 positioned in the housing base 410 and the housing cover 412 align to form port openings 470 (e.g., cable insertion opening) at the first end 428 of the enclosure housing 402. The fingers 466 of the insert assembly 452 are flexible such that when a cable is inserted therethrough, the fingers 466 project inwardly with the cable.

The insert assembly 452 can also be used to prevent sealant from coming out of the cable port. The insert assembly 452 can be dropped into the enclosure housing 402 as one piece with the fingers 466 of the cutouts 460 being integrated therein. When the housing cover 412 is pivoted closed onto the housing base 410, a sealant within the enclosure housing 402 can be compressed to apply pressure onto the fingers 466 of the insert assembly 452. The fingers 466 may bow and flex inwardly with the cable such that a seal is formed thereabout. The fingers 466 of the insert assembly 452 hold the sealant inside the enclosure housing 402. The sealant may comprise gel and/or gel combined with another material such as an elastomer. The gel may, for example, comprise silicone gel, urea gel, urethane gel, thermoplastic gel, or any suitable gel or geloid sealing material. The sealant may also comprise of a rubber material.

It will be appreciated that seals can be designed for one cable lead-in as a separate single insert formed and adapted to removably seal one cable port. For example, the insert assembly 452 may include one separate cutout 460 for sealing a single cable port 406 as shown at the second end 430 of the enclosure housing 402.

From the forgoing detailed description, it will be evident that modifications and variations can be made in the methods of the disclosure without departing from the spirit or scope of the disclosure.

What is claimed is:

1. A cable anchoring unit for anchoring a cable, the cable anchoring unit comprising:
    an anchor base adapted to be mounted at a mounting location of a supporting component, the anchor base having a top side that defines an open-topped channel having a length that extends along a cable routing axis, the anchor base having a bottom side defining a clearance recess positioned beneath the channel;
    a cable cover that mounts over the open-topped channel of the anchor base, the cable cover having a bottom side that forms an open-bottom channel that opposes the open topped-channel of the anchor base and cooperates with the open-topped base to form a cable jacket clamp for clamping a jacket of the cable;
    a strap-type clamp actuator that extends through the clearance recess and over the cable cover for forcing the cable cover toward the anchor base to provide a jacket clamping action;
    a first plate that mounts on the top side of the anchor base, the first plate including lower section, an upper section and a ramp section that extends between the lower and upper sections, the lower section being supported at the top side of the anchor base, the upper section being elevated relative to the lower section, the upper section including a finger section and a stop section that forms a positive stop for opposing an end of a strength member of the cable;
    a second plate that mounts over the first plate, the second plate having a plurality of upper projections configured to embed within the jacket of the cable, wherein the first and second plates are electrically conductive and are in electrical contact with one another, and wherein the projections are configured to make electrical contact with a shield layer of the cable; and
    a strength member clamp arrangement for clamping the strength member of the cable, the strength member clamp arrangement being configured to mount on the finger section of the top section of the first plate.

2. The cable anchoring unit of claim 1, wherein the anchor base is configured to attach to the mounting location of the supporting component by a snap-fit connection.

3. The cable anchoring unit of claim 1, wherein the first plate includes a grounding tab.

4. The cable anchoring unit of claim 1, wherein the anchor base and the cable cover are molded plastic parts, and wherein the cable cover is connected to the anchor base by a living hinge.

5. The cable anchoring unit of claim 1, wherein the strength member clamp arrangement includes a clamp housing through which the finger section extends, and wherein the strength member clamp arrangement also includes an actuating element coupled to the clamp housing.

6. The cable anchoring unit of claim 5, wherein the clamp housing has an upper clamping region having a generally v-shaped transverse cross-section, and wherein the clamp housing has a bottom wall through which the actuating element extends.

7. The cable anchoring unit of claim 6, wherein the actuating element includes a threaded member that threads within an opening defined through the bottom wall of the clamp housing.

8. The cable anchoring unit of claim 1, wherein the cable cover defines a plurality of ribs within the open-bottomed channel that are spaced apart from one another along the cable routing axis, the ribs being transversely oriented relative to the cable routing axis.

9. The cable anchoring unit of claim 1, wherein the second plate includes a downward extension a first end that extends through an opening in the first plate and engages the anchor base by a snap-fit connection.

10. The cable anchoring unit of claim 9, wherein the first plate includes a grounding tab.

11. A cable insert assembly for an optical termination enclosure, the optical termination enclosure including a cover, a base, and a sealant material, the sealant material providing an environmental seal between the cover and the base when the optical termination closure is in a closed configuration, the cable insert assembly comprising:
    first and second insert members, the first insert member being located in the cover and the second insert member being located in the base;
    at least one half-circle segment formed in each one of the first and second insert members, the cover being mounted on the base such that the at least one half-circle segment of the first insert member is fitted with the at least one half-circle segment of the second insert member to form a cable insertion opening; and
    a plurality of slits defined in each one of the at least one half-circle segment of the first and second insert members to form a plurality of fingers;

the plurality of fingers being adapted to retain the sealant material inside of the optical termination enclosure, the plurality of fingers being oriented in a first, single plane orientation, and in a second orientation;

when in the second orientation, the plurality of fingers are flexed at an angle relative to the first, single plane orientation and are adapted to accommodate a cable therethrough.

12. The cable insert of claim 11, wherein the first and second insert members of the cable insert assembly each includes a substantially curved bottom edge.

13. The cable insert of claim 11, wherein the fingers flex inwardly in the second orientation that is substantially perpendicular to the first, single plane orientation as the cable is inserted through the cable insertion opening.

14. A cable insert assembly for an optical termination enclosure, the optical termination enclosure including first and second housing pieces that meet at a sealed perimeter interface and a sealant material, wherein when the first and second housing pieces are mated together, the sealant material provides an environmental seal therebetween, the cable insert assembly comprising:

first and second insert members respectively mounted in the first and second housing pieces; and at least one half-circle segment formed in each one of the first and second insert members, the at least one half-circle segment of each one of the first and second insert members including a plurality of fingers, when the first and second housing pieces are mated together, the at least one half-circle segment of the first insert member is fitted with the at least one half-circle segment of the second insert member to form a cable insertion opening;

the plurality of fingers being adapted to retain the sealant material inside of the optical termination enclosure, the plurality of fingers being oriented in a first, single plane orientation, and in a second orientation;

when in the second orientation, the plurality of fingers are flexed at an angle relative to the first, single plane orientation and are adapted to accommodate a cable therethrough.

* * * * *